United States Patent
Evans et al.

(10) Patent No.: US 6,877,785 B2
(45) Date of Patent: Apr. 12, 2005

(54) BUMPER SYSTEM WITH FACE-MOUNTED ENERGY ABSORBER

(75) Inventors: Darin Evans, Wixom, MI (US); Mark Weissenborn, Grand Rapids, MI (US)

(73) Assignee: NetShape International, LLC, Novi, MI (US)

( * ) Notice: Subject to any disclaimer, the term of this patent is extended or adjusted under 35 U.S.C. 154(b) by 0 days.

(21) Appl. No.: 10/794,641

(22) Filed: Mar. 5, 2004

(65) Prior Publication Data

US 2004/0169381 A1 Sep. 2, 2004

Related U.S. Application Data

(62) Division of application No. 10/407,413, filed on Apr. 4, 2003, which is a continuation-in-part of application No. 10/061,670, filed on Feb. 1, 2002, now Pat. No. 6,609,740, which is a division of application No. 09/967,196, filed on Sep. 28, 2001, now Pat. No. 6,575,510.

(60) Provisional application No. 60/283,969, filed on Apr. 16, 2001, and provisional application No. 60/284,058, filed on Apr. 16, 2001.

(51) Int. Cl.[7] .............................................. B60R 19/03
(52) U.S. Cl. ...................................... 293/120; 293/121
(58) Field of Search ................................. 293/120, 121, 293/122

(56) References Cited

U.S. PATENT DOCUMENTS

| | | | |
|---|---|---|---|
| 4,998,761 A | | 3/1991 | Bayer et al. |
| 5,290,078 A | * | 3/1994 | Bayer et al. ................ 293/120 |
| 5,425,561 A | | 6/1995 | Morgan |
| 5,803,517 A | | 9/1998 | Shibuya |
| 6,000,738 A | * | 12/1999 | Stewart et al. ............. 293/120 |
| 6,082,792 A | | 7/2000 | Evans et al. |
| 6,179,353 B1 | | 1/2001 | Heatherington et al. |
| 6,406,081 B1 | | 6/2002 | Mahfet et al. |
| 6,467,831 B1 | * | 10/2002 | Mori et al. ................. 293/120 |
| 6,575,510 B2 | | 6/2003 | Weissenborn |
| 6,726,261 B2 | * | 4/2004 | Goto et al. ................. 293/120 |
| 2003/0020290 A1 | * | 1/2003 | Cherry ....................... 293/120 |

* cited by examiner

Primary Examiner—Jason Morrow
(74) Attorney, Agent, or Firm—Price, Heneveld, Cooper, DeWitt & Litten LLP

(57) ABSTRACT

A bumper includes a beam and an energy absorber supported on its face. The beam includes front and rear beam walls, with a pair of apertures in the front beam wall, and further the energy absorber includes a pair of tubular structural columns extending from its front wall through the aperture in the front beam wall to the rear beam wall. By this arrangement, the front wall of the energy absorber receives support from the rear beam wall via the structural columns during a vehicle crash.

20 Claims, 18 Drawing Sheets

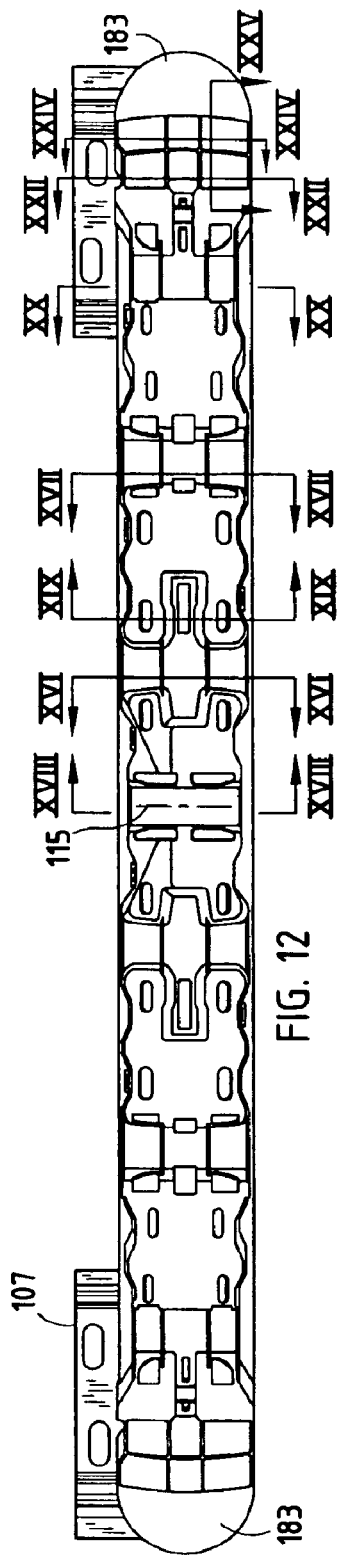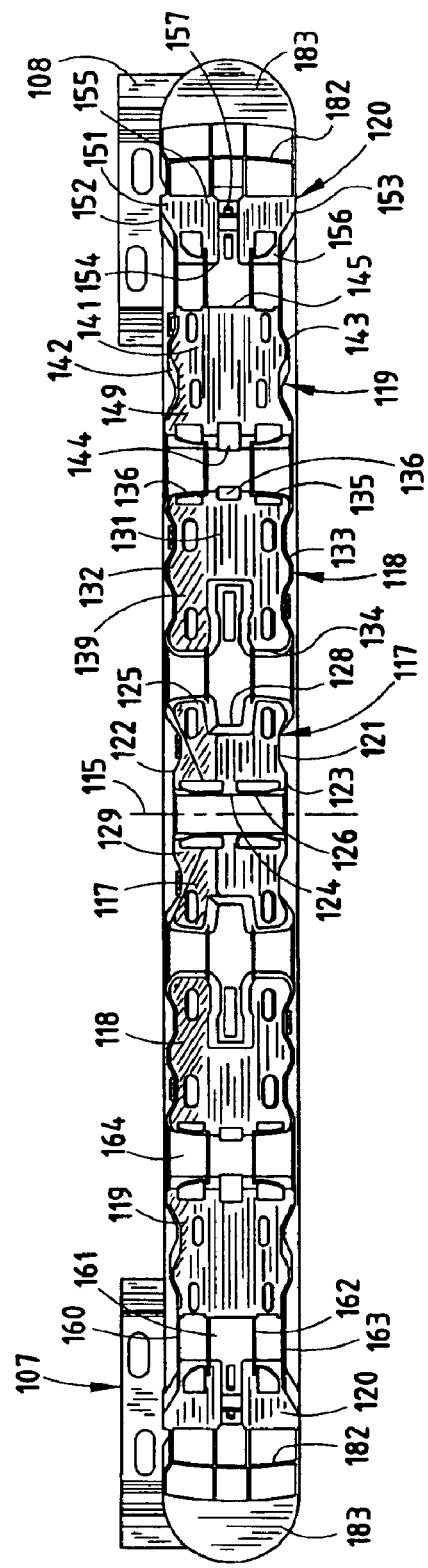

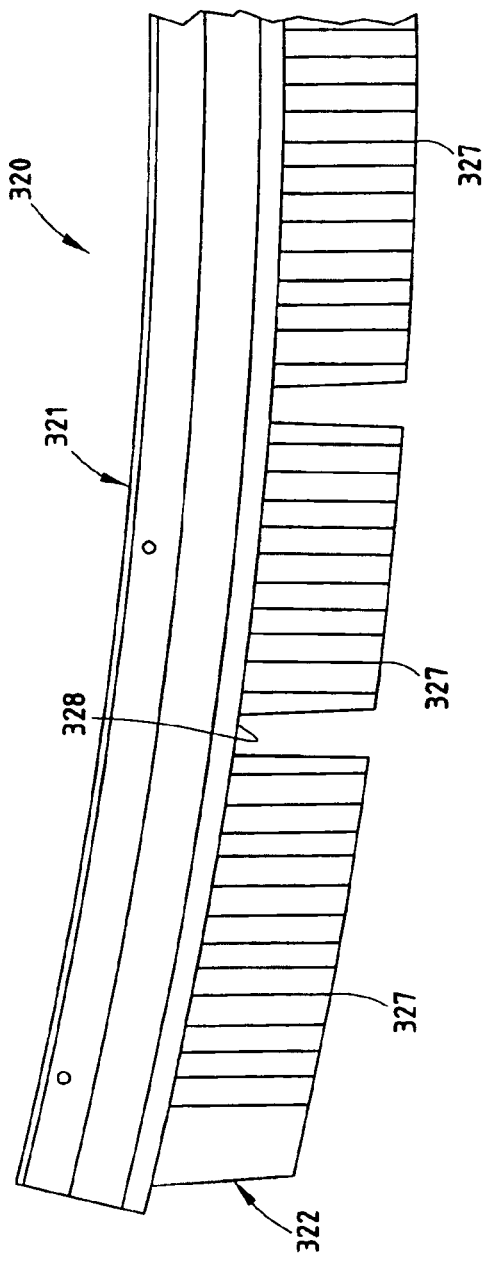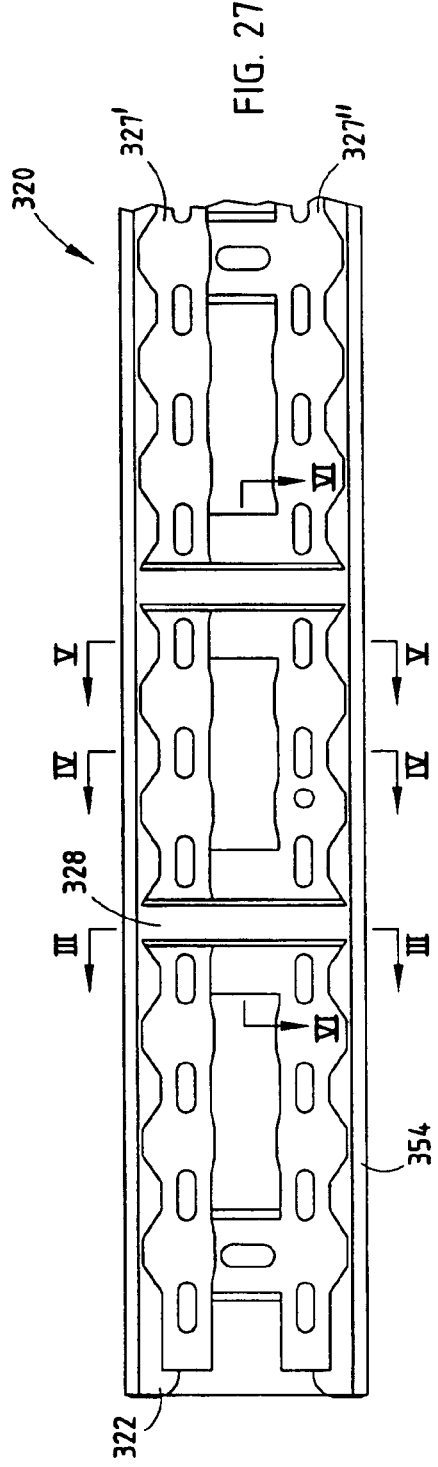

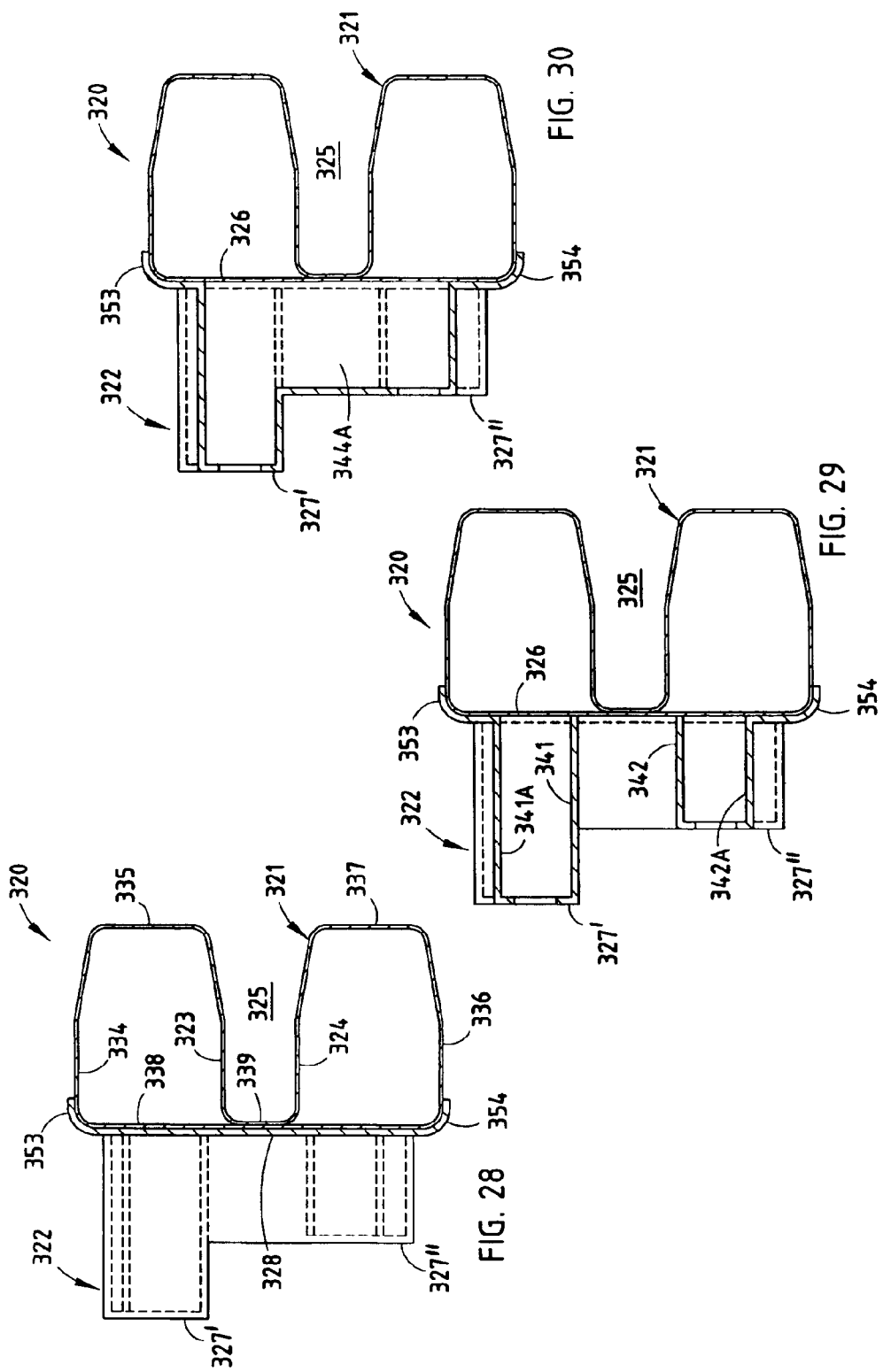

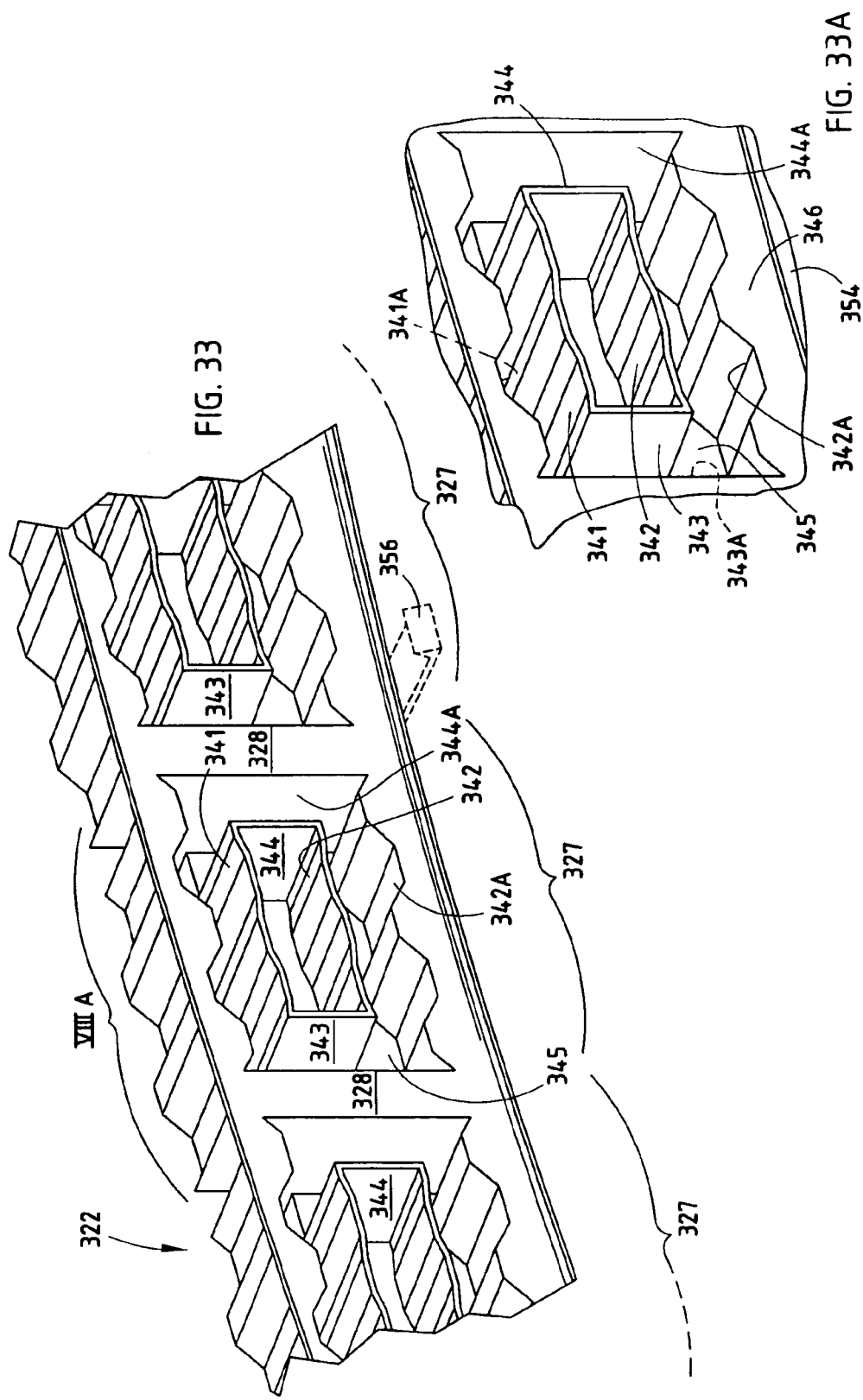

BUMPER SYSTEM WITH FACE-MOUNTED ENERGY ABSORBER

CROSS-REFERENCE TO RELATED APPLICATIONS

This application is a divisional application of application Ser. No. 10/407,413, filed Apr. 4, 2003, entitled BUMPER SYSTEM WITH FACE-MOUNTED ENERGY ABSORBER, which is a continuation-in-part of application Ser. No. 10/061,670, filed Feb. 1, 2002, now U.S. Pat. No. 6,609,740 entitled BUMPER SYSTEM WITH FACE-MOUNTED ENERGY ABSORBER, which in turn claims benefit under 35 U.S.C. 119(e) of a provisional application Ser. No. 60/283,969, filed Apr. 16, 2001, entitled BUMPER SYSTEM WITH FACE-MOUNTED ENERGY ABSORBER. This application is further a continuation-in-part of application Ser. No. 09/967,196, filed Sep. 28, 2001, now U.S. Pat. No. 6,575,510 entitled BUMPER SYSTEM WITH FACE-ABUTTING ENERGY ABSORBER, which in turn claims benefit of provisional application Ser. No. 60/284,058, filed Apr. 16, 2001, entitled BUMPER SYSTEM WITH FACE-ABUTTING ENERGY ABSORBER under 35 USC §119.

BACKGROUND OF THE PRESENT INVENTION

The present invention relates to automotive bumper systems having beams and energy absorbers located-on faces of the beams.

Many vehicle designs use energy absorbers positioned on a face or front surface of a steel bumper beam to improve energy absorption of a bumper system. The energy absorbers provide an initial level of energy absorption for low impact, including reducing damage during low impact, and also provide a supplemental level of energy absorption during high impact (i.e. before and at the time that the beam and vehicle begin to absorb substantial amounts of energy). Usually, the energy absorbers are fastened to the bumper beam with fasteners that assure accurate positioning of the energy absorber on the beam. The reasoning includes accurately positioning the energy absorber on the bumper beam to assure consistent performance, as well as to assure accurate positioning for aesthetics and assembly (e.g. to assure a good fit of the front-end fascia over the energy absorber and beam during assembly).

However, improvements are desired in terms of temporary and permanent attachment, and for improved and more reliable energy absorption. Typically, attachment of the energy absorber to bumper beams requires a plurality of mechanical fasteners. This is disadvantageous since mechanical fasteners require manual labor to install, which can add undesirably to cost. Also, the mechanical fasteners can result in localized and non-uniform stress distribution during impact, resulting in inconsistent collapse of the bumper system and poor energy absorption on impact. Further, fixing the energy absorber to the beams results in an inability of the energy absorber to shift and adjust to non-perpendicular and uneven loads transmitted from the impacting bodies. At the same time, depending on the bumper system, sometimes shifting of an energy absorber is not good since it can result in unpredictable, premature and non-uniform collapse, resulting in poor or inconsistent energy absorption by the bumper system.

Improvement is also desired for corner impact structure on bumper systems. Many existing bumper systems require that a front surface of an end of a bumper beam be shaped at an increased angle relative to the front of rest of the bumper beam to match an aerodynamic curvature of the vehicle at its front fender. One way to achieve this is by miter cutting an end of the bumper beam at an angle, and thereafter welding a plate onto the angled end to form a compound-angled flat front surface for supporting an energy absorber such as a foam cushion. Another way is to deform or crush an end of the bumper beam to form an angled front surface. Yet another way is to weld a bracket onto an end of the bumper beam, with the bracket extending longitudinally beyond the bumper beam to form the desired shape. However, all of these alternatives have drawbacks. For example, they each require a secondary operation, result in increased dimensional variation, and require significant investment in capital equipment. Further, they can lead to increased scrap, a substantial increase in manpower and manufacturing time, and substantial increase in inventories and work in process.

For all of the above reasons, there is a desire for bumper systems that yield a better, more consistent, more reliable, and greater impact energy absorption, both for low and high impact events, and also for square and skewed impact directions. Also, there is a desire for improvements facilitating assembly of an energy absorber to a beam, with lower cost and fewer parts, and with less labor. Still further, there is a desire for energy absorber designs that allows adjustment and tuning for optimal front end and corner impact strengths, even late in the bumper development program, and yet that do not require expensive or complex molding techniques or assembly techniques nor secondary miter cutting or crush forming bumper end sections. Still further, there is a desire for energy absorber designs that are adaptable for use with many different bumper beam cross-sectional shapes and sizes. Also, energy absorber designs are desired that are flexible and usable on non-linear bumper beams having different curvatures and longitudinal sweeps, and having different cross sections.

SUMMARY OF THE PRESENT INVENTION

In one aspect of the present invention, a bumper system for a passenger vehicle includes a beam having front and rear beam walls, and that is adapted for attachment to a vehicle frame; the front beam wall including at least one aperture in the front beam wall, with the rear beam wall including a support area located behind and spaced from the at least one aperture. An energy absorber is supported against the front beam wall, the energy absorber including a plurality of horizontally-extending longitudinally-extending top and bottom walls and further including front and rear walls. The energy absorber walls include at least one structural column extending from the front wall through the rear wall and through the at least one aperture in the front beam wall to a location near the support area on the rear beam wall, wherein the front wall of the energy absorber receives support from the rear beam wall via the structural column.

In another aspect of the present invention, a bumper system is provided for a passenger vehicle that includes a beam adapted for attachment to a vehicle frame, the beam having elongated front and rear beam walls when the beam is positioned in a vehicle-mounted position. The front beam wall includes at least one aperture, and the rear beam wall includes a support area located behind and spaced rearwardly from the at least one aperture. The bumper system also includes an energy absorber having a rear surface supported against the front beam wall. The energy absorber includes least one rearwardly-extending structural protrusion that extends from the rear surface through the at least one aperture to a location proximate the support area on the rear beam wall. By this arrangement, the energy absorber receives support from the rear beam wall via the structural protrusion during a vehicle crash.

These and other aspects, objects, and features of the present invention will be understood and appreciated by those skilled in the art upon studying the following specification, claims, and appended drawings.

BRIEF DESCRIPTION OF DRAWINGS

FIGS. 12–14 are front, top and bottom views of the energy absorber of FIG. 11.

FIG. 12A is a front view like FIG. 12, but with a front face of the energy absorber shaded to better show the "box-shaped" areas on the energy absorber;

FIGS. 26 and 27 are fragmentary perspective views of a bumper system of the present invention, including a bumper beam and an energy absorber;

FIGS. 28–31 are cross-sectional views of the energy absorber taken along the lines III—III, IV—IV, V—V, and VI—VI in FIG. 27; and FIGS. 32 and 33 are front and rear perspective views of the energy absorber shown in FIG. 2, and FIG. 33A is a fragmentary perspective view of a portion of FIG. 33.

DETAILED DESCRIPTION OF PREFERRED EMBODIMENTS

The present invention is described as utilizing a B-shaped double-tube bumper beam that is rollformed and swept. The present B-shaped bumper beam is sufficiently described herein for a person skilled in the art to understand and practice the present invention, but it is noted that the process and method of making the illustrated B-shaped bumper beam is described in greater detail in Sturrus patent U.S. Pat. No. 5,454,504, if the reader desires such information. It is specifically contemplated that the present invention could be used in combination with a bumper beam having a shallower channel instead of the deep channel illustrated. For example, it is contemplated that the present invention could be made to work on a D-shaped bumper where the bumper beam had a channel extending significantly into a front face of the bumper beam but where the channel does not extend completely to a rear wall of the bumper beam. On the merits, the teachings of U.S. Pat. No. 5,454,504 are incorporated herein in its entirety for the purpose of providing a complete disclosure of the entire bumper system.

Figure 1:
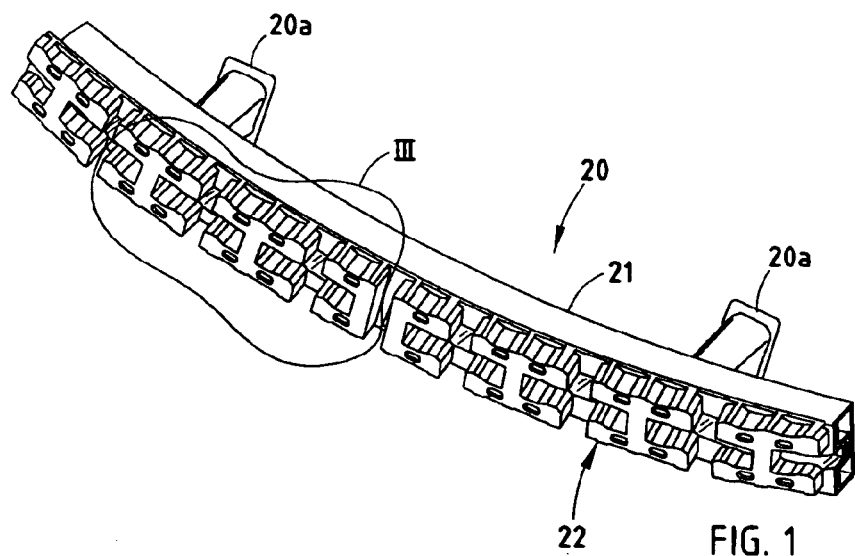
FIG. 1 is a perspective view of a bumper system of the present invention, including a bumper tubular beam and an energy absorber on a face of the bumper beam.
Figure 2:
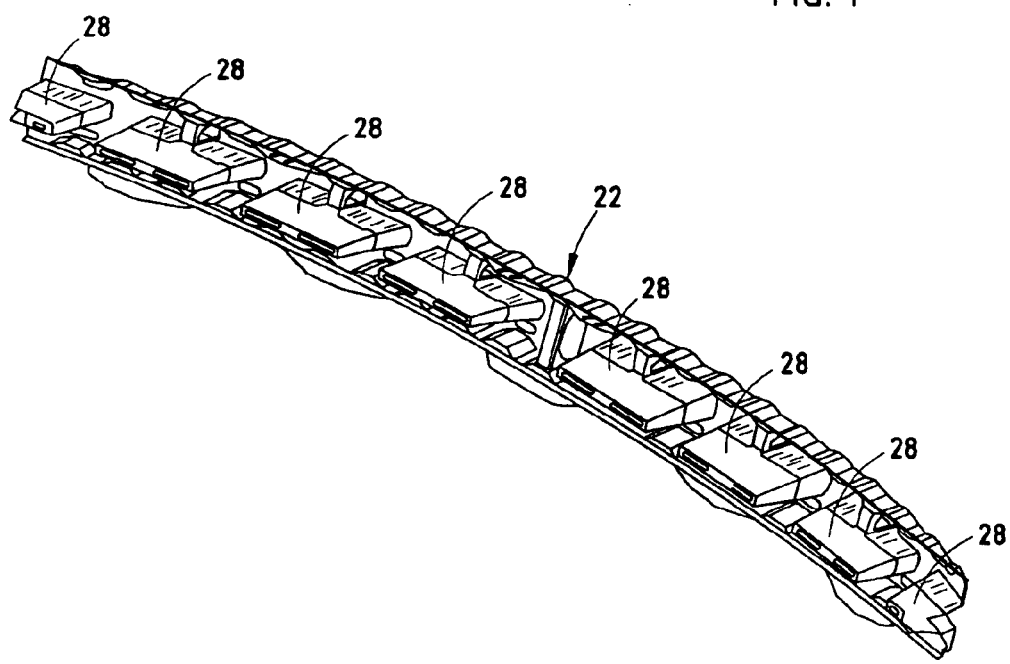
FIG. 2 is a rear perspective view of the energy absorber of FIG. 1.
Figure 3:
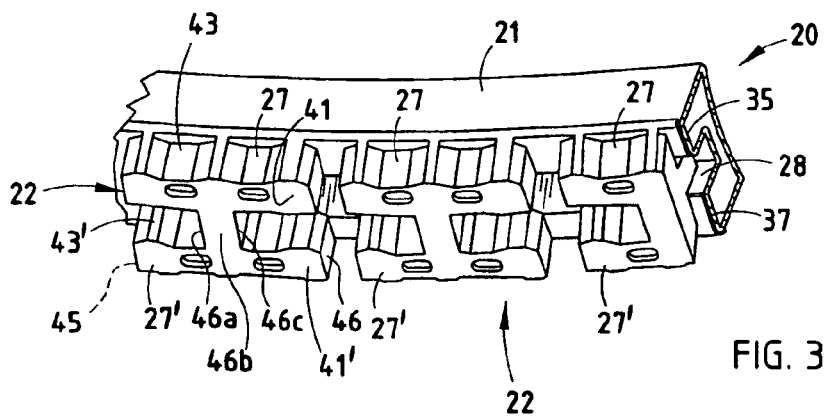
FIG. 3 is an enlargement of the circled area III in FIG. 1.

Bumper system 20 (FIG. 1) includes a bumper beam 21 attached to a vehicle, and an energy absorber 22 attached to a face of the bumper beam 21. The illustrated bumper beam 21 is attached by brackets 20A. Crush towers can also be used to mount the bumper beam. The illustrated beam is rollformed and swept (see Sturrus patent U.S. Pat. No. 5,454,504) and has a continuous B-shaped double-tubular cross section (FIG. 3). The double tubes are spaced vertically apart and include top and bottom mid-walls 23 and 24 defining a longitudinally-extending channel 25 along its front surface. A polymeric energy absorber 22 has a length with multiple top and bottom box-shaped sections 27 and 27' (not all being the same size or length) that abut the front surface 26 of the bumper beam 21. The energy absorber 22 further includes a plurality of rearwardly-extending nose sections 28 that extend into the channel 25. The nose sections 28 are trapezoidally-shaped to fit mateably into the channel 25, and extend about 50% to 60% of the way to a bottom of the channel 25. Where desired, the nose sections 28 include detents or are shaped to provide sufficient frictional engagement to temporarily retain the energy absorber 22 on the bumper beam 21. The illustrated nose sections 28 include collapse-controlling kick walls 30 and 31 that lie along and abut the top and bottom mid-walls 23 and 24 of the bumper beam 21. The kick walls 30 and 31 are non-parallel and are connected to the box-shaped sections 27 and 27' so that, upon impact by an object against the bumper system, the kick walls 30 and 31 bend in a predictable and preplanned manner and press into the top and bottom mid-walls 23 and 24. During high impact (see FIGS. 3 and 4), the kick walls 30 and 31 press with increasing force, resulting in a more consistent and controlled flexure and collapse of the box-shaped sections 27 of the polymeric energy absorber 22 and of the tube sections of the metal bumper beam 21 as a system. The nose sections 28 are trapped within the channel 25, which eliminates the problem of the energy absorber sliding vertically off a face of the bumper beam (which is a problem in some bumper systems using an energy absorber mounted to a face of a bumper beam).

The B-shaped section of the bumper beam 21 includes, in addition to top and bottom mid-walls 23 and 24, a top wall 34, a front upper wall 35, a bottom wall 36, a front lower wall 37, a rearmost rear wall 38 and a channel-forming rear wall 39. The top tube of the bumper beam 21 is formed by the walls 23, 34, 35, and 38. The bottom tube of the bumper beam 21 is formed by the walls 24, 36, 37, and 38. The top and bottom tubes are interconnected by rear walls 38 and 39. Each of these walls 23-24 and 34-39 can be flat or non-flat. For example, in some bumper systems (such as the illustrated walls 23-24), it has been found to be beneficial to make the horizontal walls 23, 24, 34, and 36 slightly bent or curved, both for purposes of providing a bumper beam that is less likely to prematurely kink and more likely to reliably and consistently bend, but also for the purpose of ease of manufacture of the bumper beam. As illustrated, the mid-walls 23 and 24 include front portions that are angled to create a tapered throat into which the nose sections 28 of the energy absorber 22 tend to move upon impact. The mid-walls 23 and 24 also include relatively flat rear portions that are generally parallel. It is noted that, upon a low force impact, the energy absorber 22 may move partially into this throat (see FIGS. 4–6) and, if sufficient energy is absorbed during the low energy impact, may return to an original shape without substantial deformation or damage to the vehicle or the bumper system.

The energy absorber 22 (FIG. 3) is a molded component of non-foam polymer, such as a blend of PC/ABS/PBT. For example, it is contemplated that General Electric's XENOY polymer will work for this purpose. As noted above, the energy absorber 22 includes top and bottom box-shaped sections 27 and 27' that abut a front of the front walls 35 and 37. The top box-shaped sections 27 engaging the top front wall 35 can be shaped slightly different than the bottom box-shaped sections 27' that engage the bottom front wall 37, if desired, but in the presently disclosed preferred embodiment, they are similar in size and shape to better assure a uniform and balanced collapse upon impact. The top box-shaped sections 27 include a front wall 41, open rear area 42, top wall 43 and bottom wall 44, as well as end walls 45 and 46 that tie the walls 41, 43–44 together. The bottom box-shaped sections 27' include similar walls 41'–46'. Walls 46A, 46B, and 46C extend between and interconnect the top and bottom box-shaped sections 27 and 27'. It is noted that the top and bottom walls 43, 44, 43', and 44', when viewed from a position in front of the bumper system, can be wavy or otherwise non-linear and non-flat in shape. This provides the top and bottom walls 43, 44, 43', and 44' with increased strength for resisting buckling, and also helps eliminate distortions such as snaking that occur when molding a long part. It is also noted that the surfaces defined by the front walls and rear areas 41, 42, 41', and 42' (and potentially the top and bottom walls 43, 44, 43' and 44') are discontinuous and further include apertures to prevent die lock when molding. (i.e. They include apertures to allow mold tooling to pass through the plane of one wall to form another wall.) In a preferred form, the apertures are sufficient in size so that the molding dies do not require slides or pulls. In other words, the energy absorber 22 can be made by using hard male and female molds, neither of which require secondary movable die components for creating blind surfaces.

The nose sections 28 (FIG. 4) include kick walls 30 and 31, and further include a connector wall 48 that interconnects the leading (rear-most) ends of the kick walls 30 and 31. The connector wall 48 is located halfway into channel 25 so that it acts as a guide during impact to guide the leading ends of the kick walls 30 and 31 into the channel 25. Specifically, the connector wall 48 is positioned about 30% to 80% of the way into the channel 25, or more particularly about 50% to 60% into the channel 25. This results in the energy absorber 22 being able to absorb significant energy, such as may be incurred in a low energy impact. Specifically, in a low energy impact (FIG. 4), the energy absorber 22 absorbs a majority of the energy of the impact energy, and the energy absorber 22 and the bumper beam 21 do not permanently deform. In an intermediate energy impact (FIG. 5), the energy absorber 22 deforms substantially, potentially taking on a permanent deformation. However, the bumper beam 21 deflects and absorbs energy, but the mid-walls 23 and 24 only temporarily flex and do not permanently deform. In a high-energy impact (see FIG. 6), the kick walls 30 and 31 cause the mid-walls 23 and 24 to buckle as they approach a maximum amount of deflection. Both the energy absorber 22 and the bumper beam 21 permanently deform. The point of buckling is designed into the bumper system 20 to cause a two-step collapse (FIGS. 5–6) so that a maximum amount of energy is absorbed without damaging the vehicle, while considering all relevant factors such as preferred de-accelerations, occupant safety, government standards, and the like.

The top kick wall 30 (FIG. 4) includes a root region 50 that connects to the bottom wall 44 of the top box section 27, and the bottom kick wall 31 includes a root region 51 that connects to the top wall 43' of the bottom box section 27'. This direct connection allows the nose section 28 to react quickly and directly to an impact, because the impact energy is transferred directly through the bottom wall 44 of the box section 27 to the kick wall 30, and because the impact energy is transferred directly through the top wall 43' of the bottom box section 27' to the kick wall 31. Due to walls 42, the natural flow of material at 50 and 51 during impact cause the material to move into walls 30 and 31 along directions A and B, respectively (see FIG. 5).

A top flange 53 (FIG. 4) extends rearwardly from the top box section 27, and a bottom flange 54 extends rearwardly from the bottom box section 27'. The flanges 53 and 54 engage top and bottom surfaces on the bumper beam 21. Optionally, the flanges 53 and 54 can include attachment tabs or hooks for engaging apertures or features in the bumper beam 21 for retaining (temporarily or permanently) to the bumper beam 21. The illustrated flanges 53 and 54 include fingertip-like pads 53' and 54' that frictionally engage top and bottom surfaces of the bumper beam 21. These frictional flanges 53 and 54 are advantageous in that all (or most) fasteners can be eliminated. It is also noted that hooks may extend through holes in the faces 35 and 37 of the bumper beam 21 and retain the energy absorber 22 on the beam 21.

Figure 4:
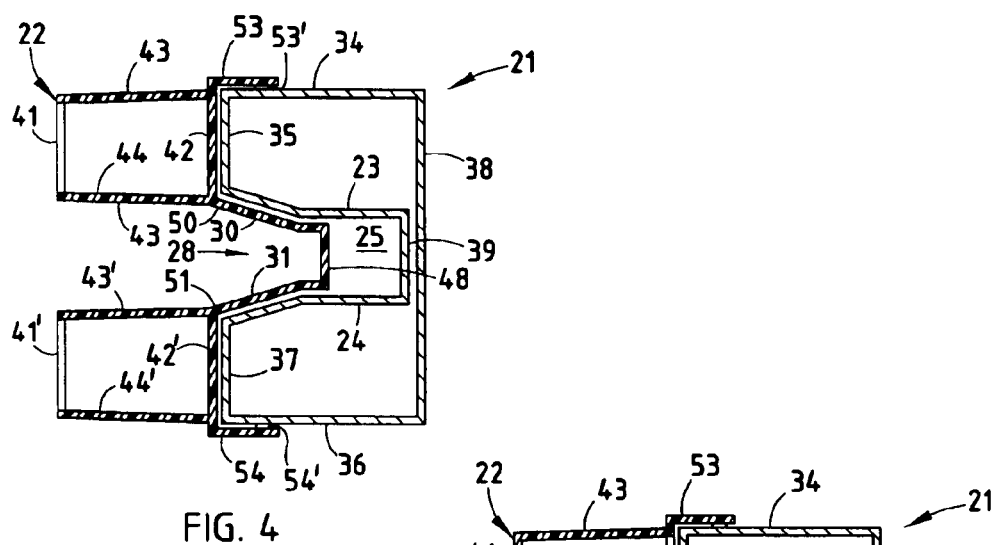
FIGS. 4–6 are cross-sectional views of the bumper system of FIG. 1, FIG. 4 being before impact, FIG. 4A being similar to FIG. 4 but showing the structure needed to avoid die lock during molding, FIG. 5 being at a time of low impact, and FIG. 6 being at a time of high impact, respectively.
Figure 4A:
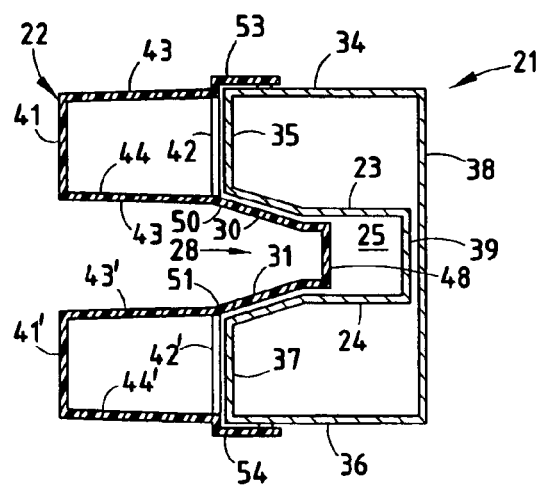
Figure 5:
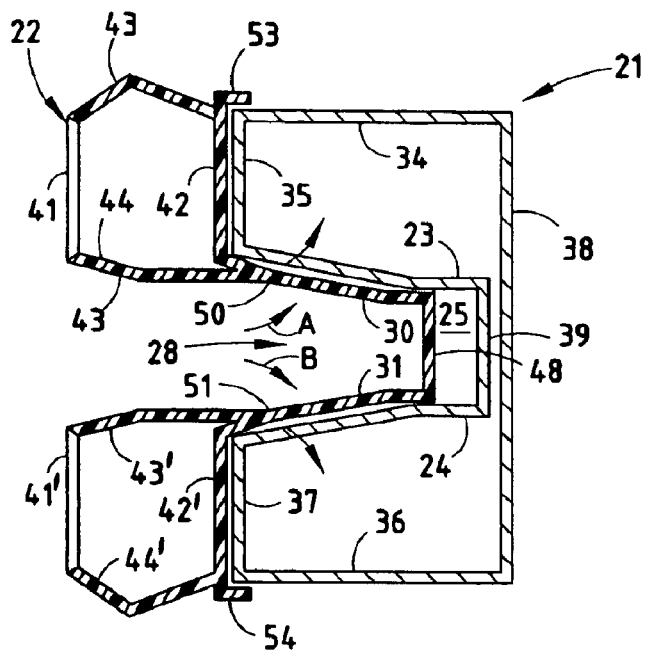
Figure 6:
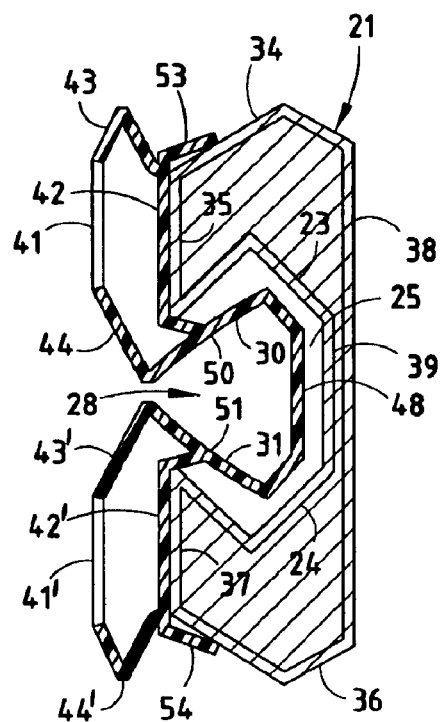

It is noted that the present arrangement (see FIGS. 3 and 4–6) "reverses" the B-shaped cross section of the bumper beam 21 relative to the vehicle that it is attached to, which creates a usable energy absorbing crush space within the channel of the bumper beam 21. Previously, B-shaped bumper beams were typically used with the flat side of the B shape facing forwardly and supporting the energy absorber. However, with the flat side of the B shape facing forwardly, the known energy absorbers can only collapse against the flat side. Thus, energy absorption is more limited than in the present design. Specifically, the present arrangement of FIGS. 4–6 provides for a more controlled and predictable two-stage energy absorption upon impact, because the energy absorber kick walls 30 and 31 stabilize the walls 23 and 24 of the bumper beam 21 during initial impact. Further, the arrangement causes the nose section 28 to slide into the channel of the bumper beam 21, providing an intermediate step of energy absorption, which helps in reading sensor outputs for sensing impacts, such as are used for air bag deployment. Still further, it is believed to be novel to utilize wall structure in an energy absorber to "kick" out and cause predictable collapse of a steel bumper beam (see FIG. 6), as in the present invention described above.

It is contemplated that corner sections can be molded onto ends of the energy absorber 22 or integrally formed as part of the energy absorber. Advantageously, the corner sections can be specifically designed to satisfy a variety of functional and aesthetic conditions. For example, the corner sections can be square-shaped and can be molded with any amount of wall thickness and ribs desired, such that substantially increased amount of corner impact loading can be successfully dissipated by the corner section. Alternatively, a different polymeric material can be molded onto ends of the energy absorber to create the corner section, such as a glass reinforced stiffer polymeric material.

Figure 8:
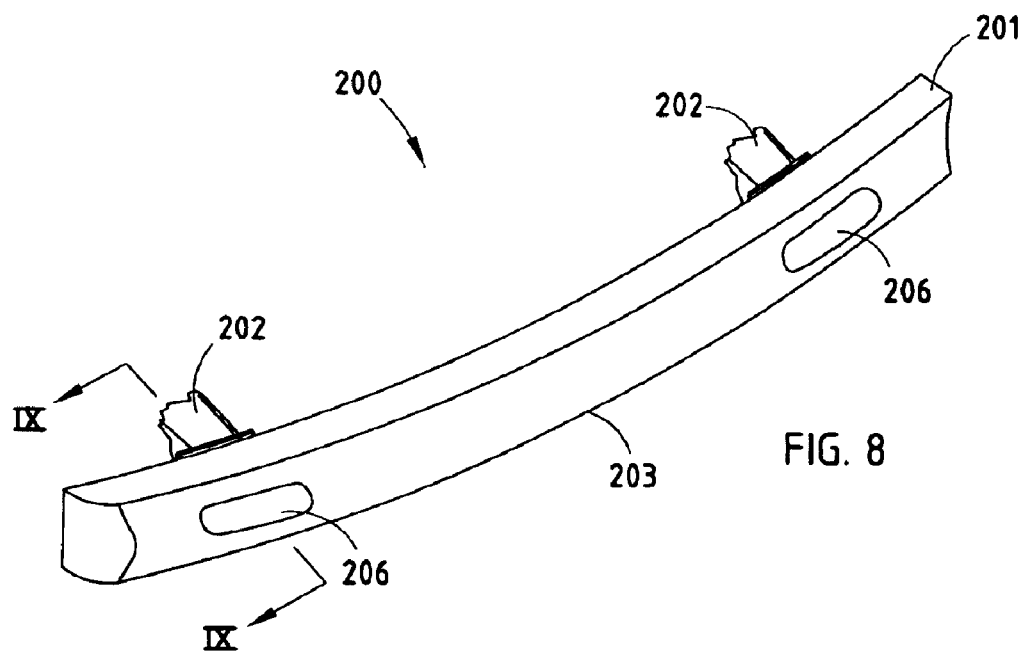
FIG. 8 is a perspective view of another bumper system including a bumper beam and an energy absorber with rearward projections extending through holes in a front surface of the bumper beam.
Figure 9:
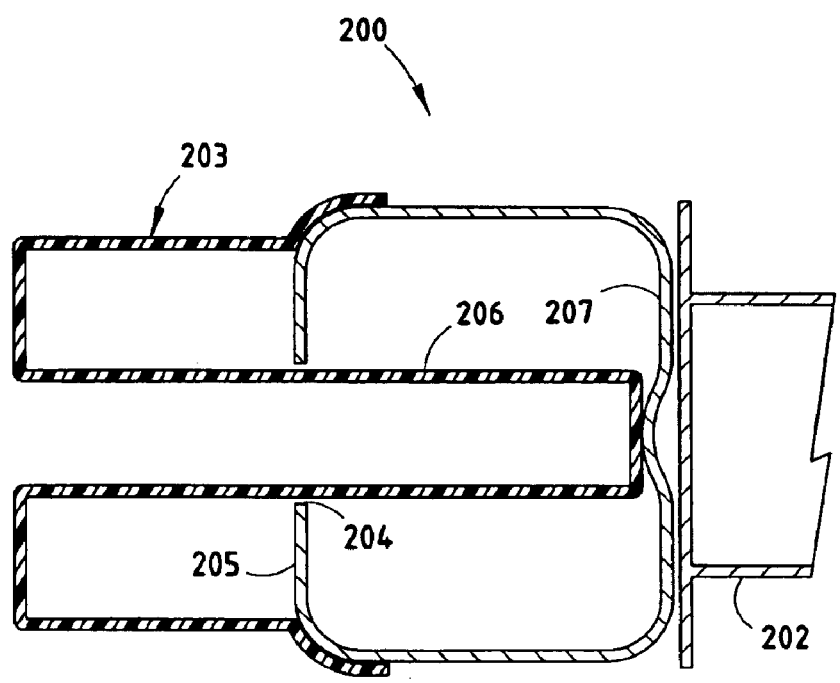
FIG. 9 is a cross sectional view taken along line IX—IX in FIG. 8.

FIGS. 8–9 show a bumper system 200 including a D-shaped single-tube bumper beam 201 supported on mounting towers 202, and an energy absorber 203 that functions similar to the bumper beam 20 and energy absorber 21 discussed above. The bumper beam 201 includes two spaced apertures 204 in its front surface 205, and the energy absorber 203 includes rearwardly projecting nose sections 206 that project through the apertures 204 and that extend to the rear wall 207 of the bumper beam 201. The illustrated nose sections 206 abut the rear wall 207, but it is noted that they can terminate short of the rear wall 207 to provide a stepped crush stroke that provides different levels of energy absorption at different impact stroke depths. It is contemplated that more or less apertures 204 and nose sections 206 can be used. During a vehicle impact, the nose sections 206 provide an initial level of impact strength and energy absorption. As the impact stroke increases, the nose sections 206 buckle outwardly, and engage top and bottom walls of the bumper beam 201. An advantage of the bumper system 200 is that it provides good localized control and a consistent and repeatable energy absorption over energy absorption during impact.

Figure 7:
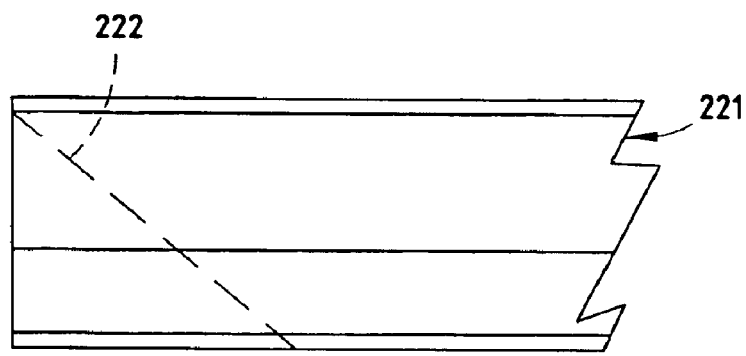
FIGS. 7–7B are fragmentary top views of a prior art bumper system, FIG. 7 showing a bumper beam including an angled miter cut (in dashed lines), FIG. 7A showing a plate welded onto the angled end of the bumper beam, and FIG. 7B showing a foam energy absorber on the bumper beam.
Figure 7A:
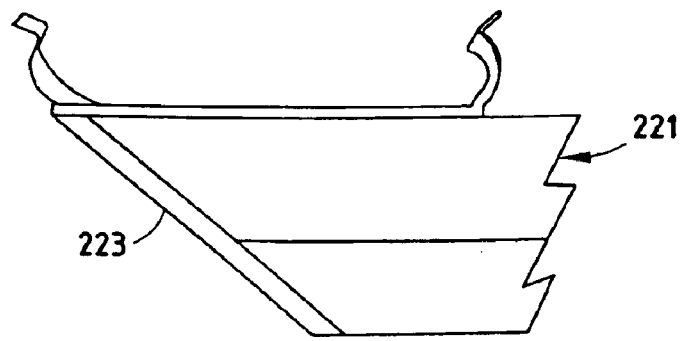
Figure 7B:
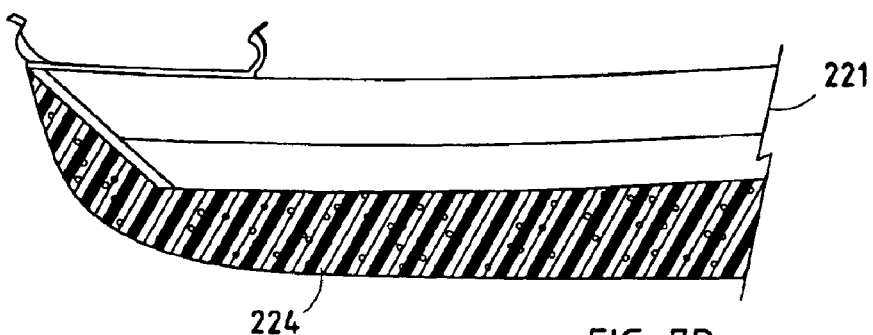

Prior art (FIGS. 7–7B) includes a B-shaped bumper beam 221, miter cut at an angle along a line 222, with a flat plate 223 welded onto the cut end to provide an extended flat front surface having an increased angle at the miter cut end. A foam energy absorber 224 is positioned against the flat front surface of the bumper beam 221, and extends onto the flat plate 223. The arrangement below eliminates the need to miter cut ends of a bumper beam, which is advantageous because miter cutting is an expensive secondary operation that takes time, money, equipment, and results in increased inventories. The invention described below eliminates the miter cutting and secondary operations needed in the bumper system 221/222.

Modification

Figure 10:
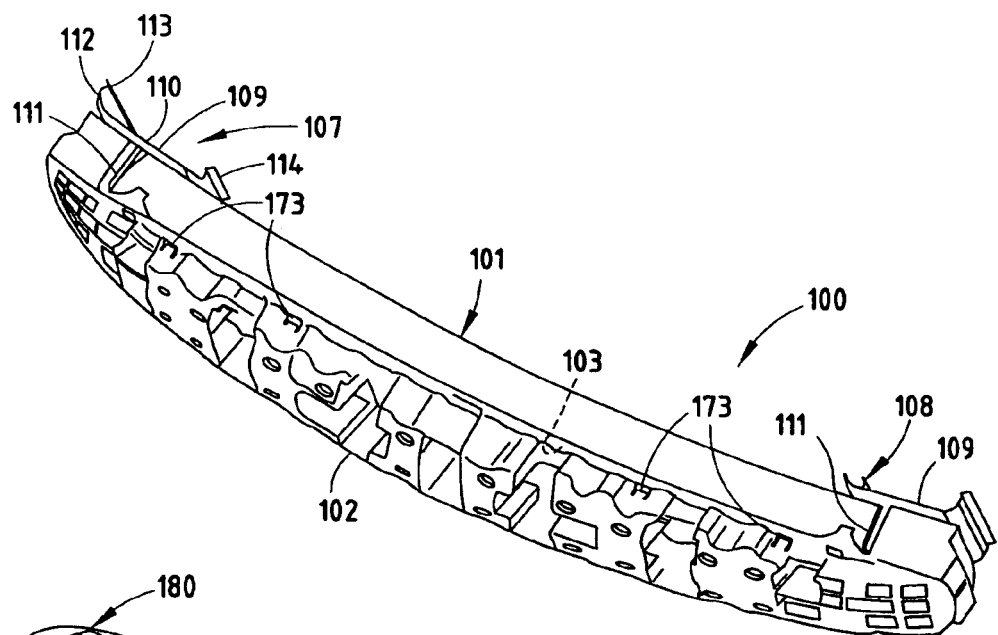
FIG. 10 is a front perspective view of a bumper system including the bumper beam and the energy absorber.
Figure 18:
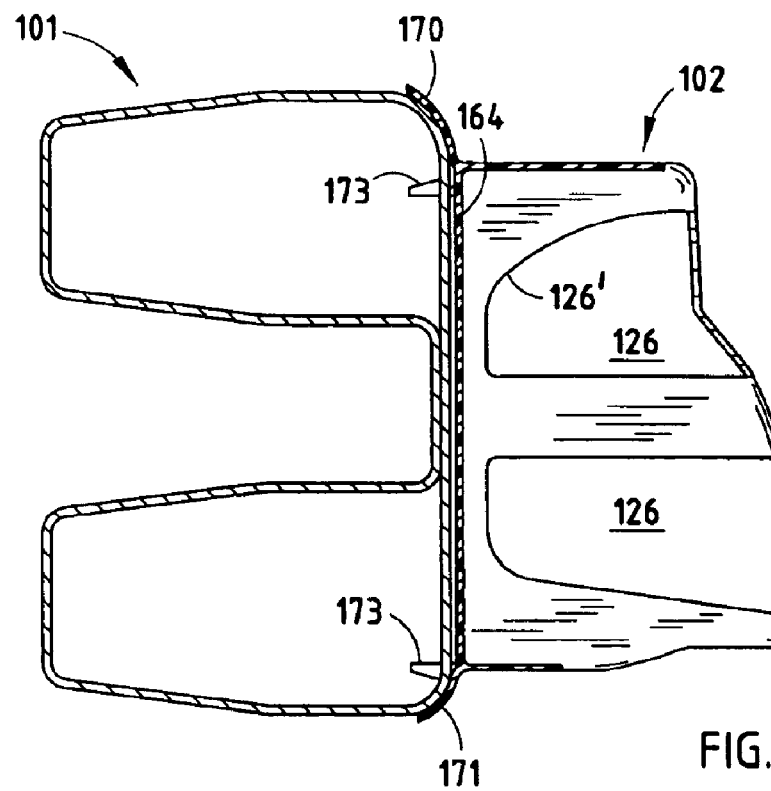
Figure 19:
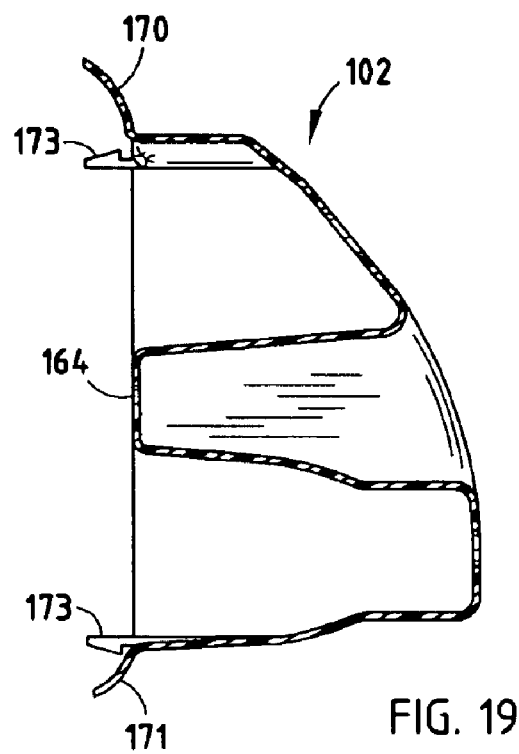
Figure 20:
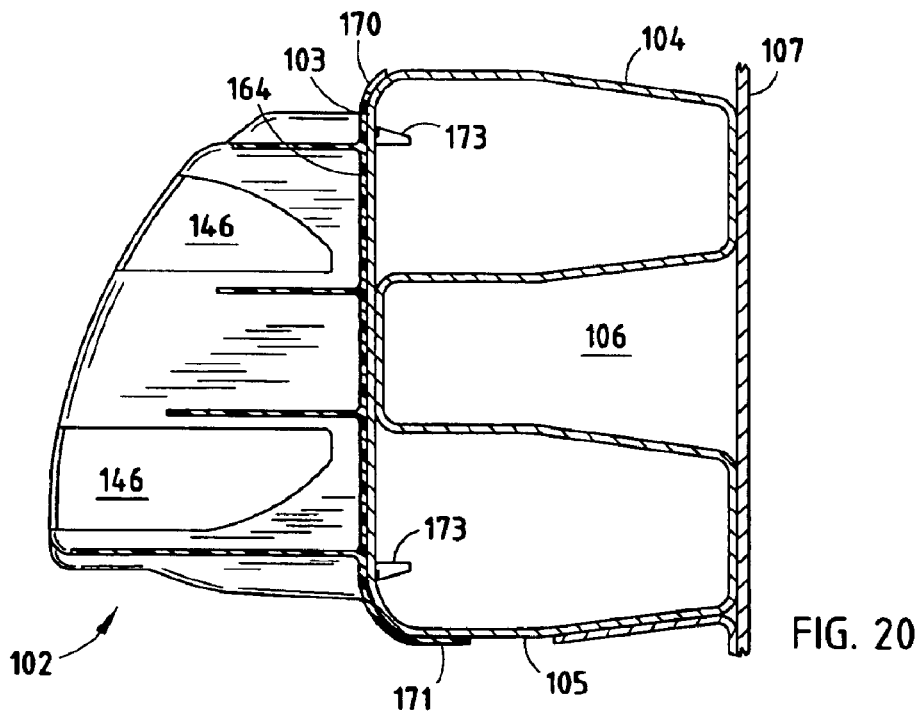

Bumper system 100 (FIG. 10) includes a B-shaped bumper beam 101 and an energy absorber 102 attached to the beam's "flat" front face. The energy absorber 102 incorporates box-shaped sections similar to the concept of the energy absorber 22 previously described, but does so in a manner permitting the energy absorber 102 to be used on the "flat" side of the B-shaped bumper beam 101 (i.e. the side of the B-shaped bumper beam 101 that does not have a channel formed in it (see FIGS. 18 and 20)), as described below. Also, the energy absorber 102 can be used on a D-shaped or single tube bumper beam.

Figure 13:
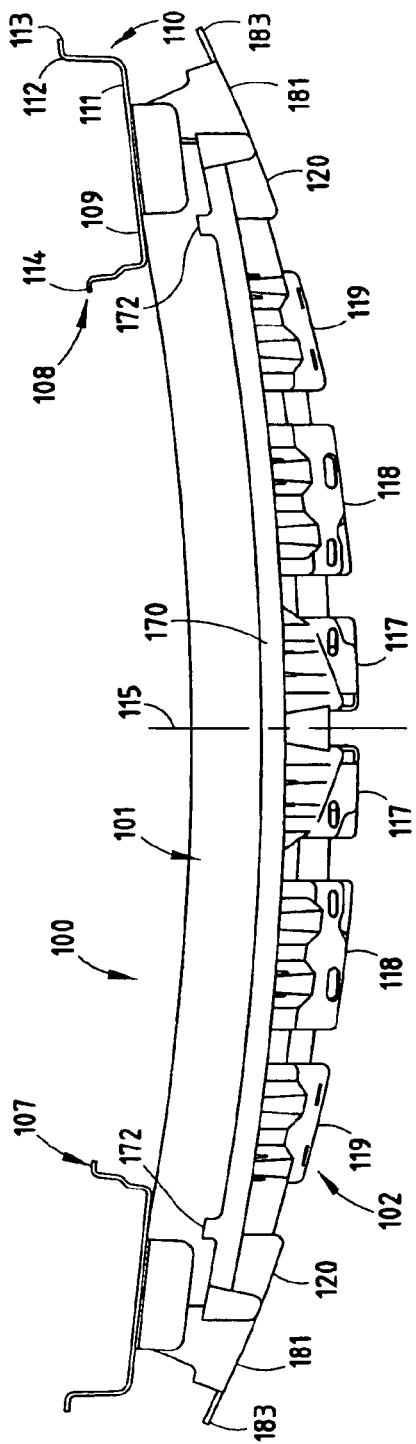
Figure 25:
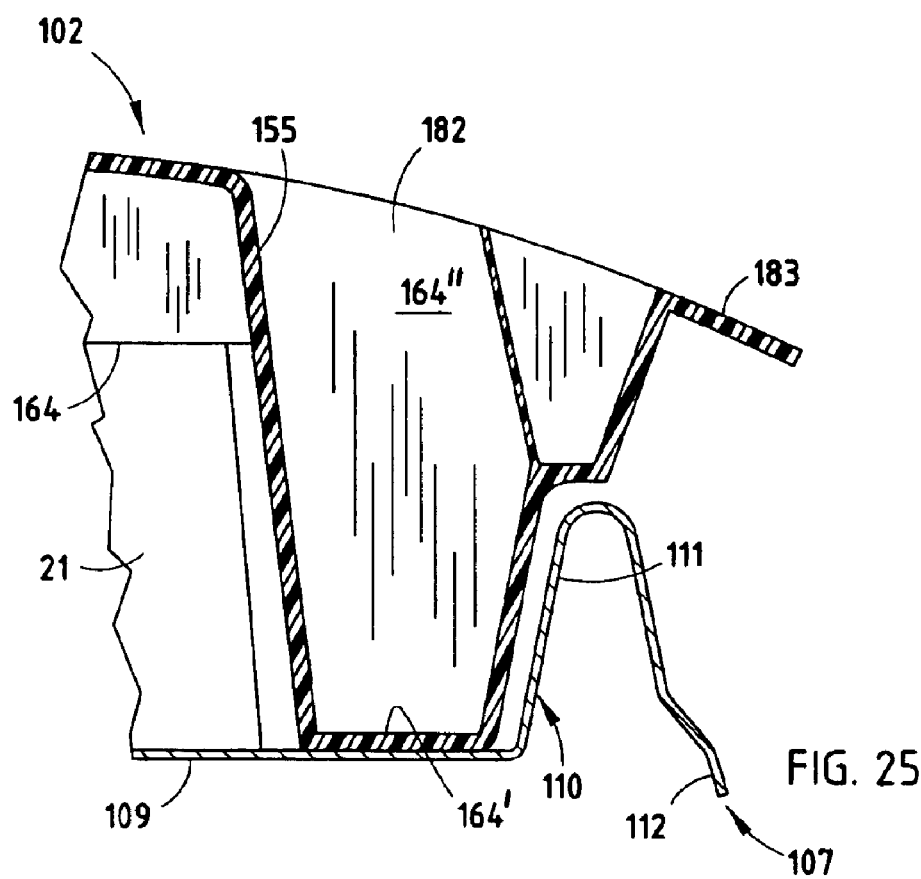
Figure 31:
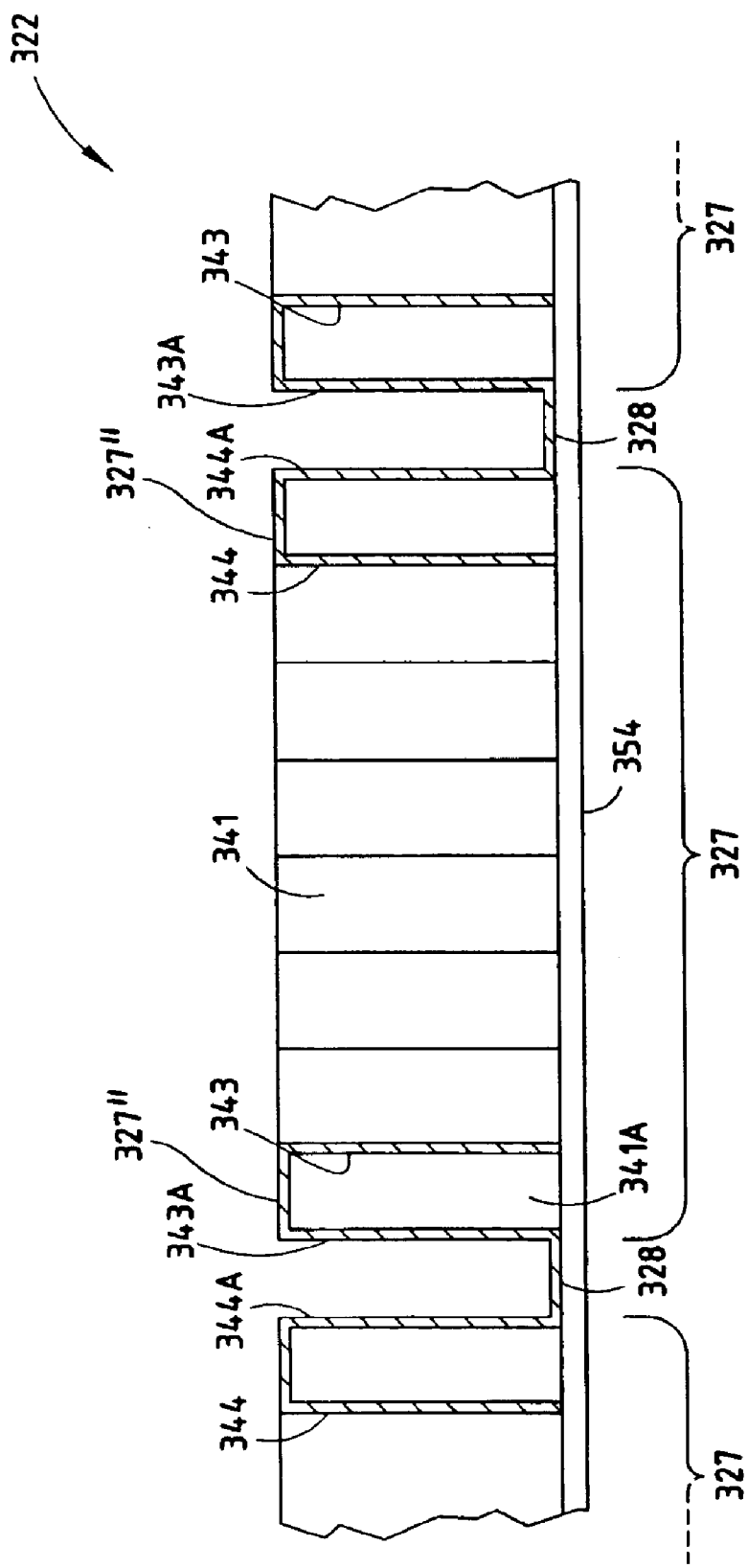

The bumper beam 101 has the same shape and walls as the bumper beam 21, except that the bumper beam 101 has an opposite longitudinal curvature for matching an aerodynamically-shaped curved front of a vehicle. In the beam 101, the longitudinal curvature places the "flat" surface 103 (FIG. 20) on a front side of the bumper beam 101, and the two tube sections 104 and 105 and the channel 106 therebetween on a rear side of the beam 101. Two mounting brackets or plates 107 and 108 (FIG. 10) are attached to the tube sections 104 and 105. The mounting plates 107 and 108 each have a flat plate section 109 that engages and is welded to a back side of the tube sections 104 and 105. A section 110 (FIG. 13) extends from the mounting plates 107 and 108 at a location about 1 inch to 1 ½ inches from an end of the tube sections 104 and 105. The sections 110 each include an outer leg 112 that extends rearward of the plate section 109, generally at a corner of the vehicle. It is contemplated that the mounting plates 107 and 108 can have a forward loop 111 that partially covers an end surface of the energy absorber if desired (see FIG. 25). Coplanar flanges 113 and 114 (FIG. 13) extend from the rear/outer ends of the brackets 107 and 108. It is noted that other mounting systems can be used for vehicle attachment on the present bumper system if desired.

Figure 15:
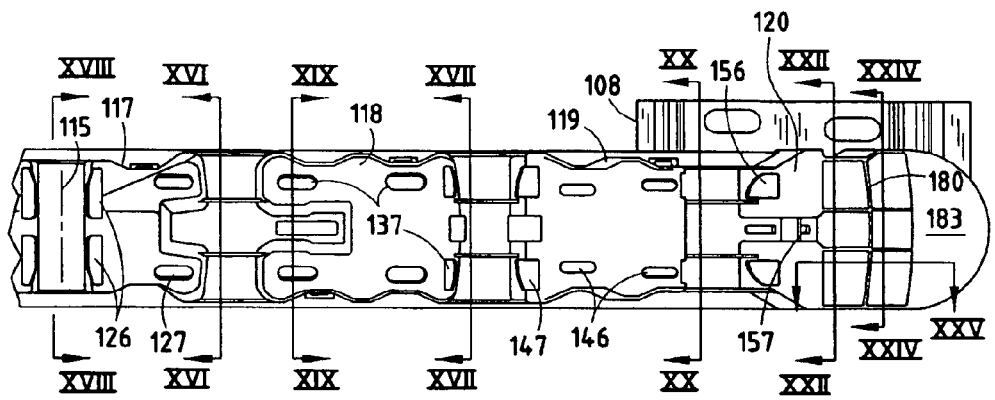
FIG. 15 is an enlarged view of the right half of FIG. 12.
Figure 16:
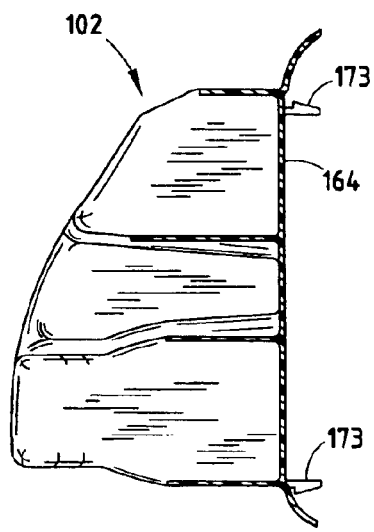
FIGS. 16–20, 22, 24, and 25 are cross sections along the lines XVI—XVI through XX—XX, XXII—XXII, XXIV—XXIV, and XXV—XXV in FIG. 15.

The energy absorber 102 is symmetrical about a centerline 115 (FIG. 12A), with each half of the energy absorber 102 including four box-shaped sections 117–120, each being interconnected by longitudinally-extending walls, as described below. The box-shaped section 117 (FIG. 12A) is adjacent the centerline 115 and includes a front face wall 121, a top wall 122, a bottom wall 123, an inboard sidewall 124 and an outboard sidewall 125. A rear of the box-shaped section 117 is open and the walls 122–125 have draft angles, so that the box-shaped section 117 can be formed on molding dies that do not require die pulls or other moving parts for forming blind surfaces. Two large "crush-initiator" apertures 126 (FIG. 15) are formed in the inboard sidewall 124 to weaken the box-shaped section 117, to provide for an optimal crush stroke upon impact against the bumper system 100 and specifically to provide for optimal energy absorption during the crush stoke. The illustrated apertures 126 are each about ⅓ of a total height of the inboard sidewall 124 (see FIG. 18), are located at a top third and a bottom third of the sidewall 124, and extend to a full depth of the sidewall 124. Different shapes of apertures can be used. The illustrated apertures 126 are not rectangular, but instead have at least one curved edge 126', which is designed to initiate a controlled crush during an impact for optimal energy absorption during impact, and which is also designed to facilitate molding. A strip of material between the apertures 126 and also the strips of material above and below the apertures 126 form the structure of sidewall 124. Apertures 127 (FIG. 15) are also formed on the front face wall 121 as desired, such as to reduce mass, improve tooling, and provide clearances and attachments to fascia. The outboard sidewall 125 has a C-shaped profile (when viewed in a car-mounted position), and has a vertical center portion 128 that is located closer to the centerline 115 than the upper and lower portions. A top angled portion 129 of the front face wall 121 slopes rearwardly from a remainder of the vertical front face wall 121, which is more vertically oriented, but not perfectly vertical.

Figure 17:
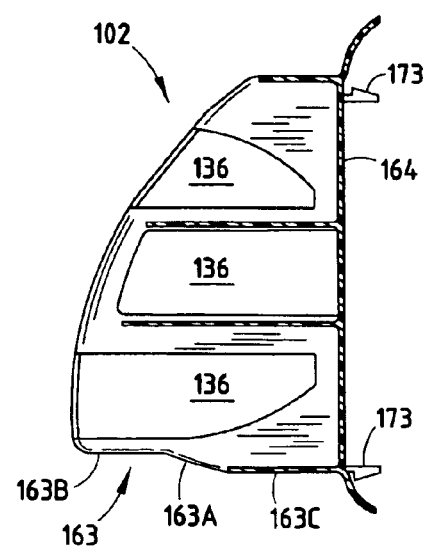

The box-shaped section 118 (FIG. 12A) is adjacent the box-shaped section 117 and includes a front face wall 131, a top wall 132, a bottom wall 133, an inboard sidewall 134 and an outboard sidewall 135. The box-shaped section 118 is about double a width of the box-shaped section 117 (in a longitudinal direction), and the inboard sidewall 135 is C-shaped to a longitudinal width about double the dimension of the C-shape of the outboard sidewall 124 of the center box-shaped section 117. Also, a top angled portion 139 of the front face wall 131 has a vertical dimension that is slightly less than the top angled portion 129 of the center box-shaped section 117, so that the combined front face of the energy absorber matches a shape of the fascia panel placed on it. The outboard sidewall 135 (FIG. 17) has three apertures 136 that are similar to the apertures 126 found in the sidewall 124 described above, with the exception that one of the apertures 136 is formed in each third of the outboard sidewall 135.

The box-shaped section 119 (FIG. 12A) is adjacent the box-shaped section 118 and includes a front face wall 141, a top wall 142, a bottom wall 143, an inboard sidewall 144 and an outboard sidewall 145. The box-shaped section 119 is about ⅔ of a width of the box-shaped section 118 (in a longitudinal direction). The inboard and outboard sidewalls 144 and 145 are relatively flat (i.e. are not C-shaped). Also, a top angled portion 149 of the front face wall 141 has a vertical dimension that is slightly less than the top angled portion 139 of the box-shaped section 118, so that the combined front face of the energy absorber matches a shape of the fascia panel placed on it. The inboard and outboard sidewalls 144 and 145 each have two apertures 146 (FIG. 20) that are similar to the apertures 126 found in the sidewall 124 described above, with the exception that the inboard sidewall 144 also has a center aperture 146.

The box-shaped section 120 (FIG. 12A) is adjacent the box-shaped section 119 and includes a front face wall 151, a top wall 152, a bottom wall 153, an inboard sidewall 154 and an outboard sidewall 155. The box-shaped section 120 is about equal in width to the box-shaped section 117 (in a longitudinal direction). The inboard and outboard sidewalls 154 and 155 are relatively flat (i.e. are not C-shaped). Also, the front face wall 151 extends to a top of the box shaped section 120, and there is not a top angled portion like the other box-shaped sections 117–119. The inboard sidewall 154 has two apertures 156 that are similar to the apertures 126 found in the sidewall 124 described above. The illustrated box-shaped section 120 is actually divided into vertically-spaced-apart halves, and consistent with that the front face wall 151 and also the inboard and outboard sidewalls 154 and 155 are actually divided into top and bottom halves, with the center section being entirely open except for a vertical stabilizing rib 157.

The illustrated box-shaped sections 117–120 are connected together by interconnecting "honeycomb-shaped" structures in the form of four horizontal ribs 160–163 (FIG. 12A) that are spaced equally apart in a vertical direction. It is contemplated that the box-shaped sections 117–120 can be connected together by different arrangements and still incorporate many of the advantages of the present energy absorber. The top rib 160 and the bottom rib 163 extend continuously from end to end of the energy absorber 102. The middle two ribs 161 and 162 also extend end to end of the energy absorber 102, with the exception that the middle ribs 161 and 162 are discontinued near the centerline 115 and do not connect the two center box-shaped sections 117. Also, the ribs 161 and 162 connect the top and bottom legs of the C-shaped inner portion of walls 125 and 134. The box-shaped sections 117–120 are also connected together by a rear wall 164. The rear wall 164 completely covers a rear of the energy absorber 102, with the exception that an opening is formed in the rear wall 164 at each of the box-shaped sections 117–120 to facilitate tooling and prevent a die lock condition. The rear wall 164 not only ties the sections 117–120 together, but also forms vertical straps that tie the top and bottom walls together to prevent the top and bottom walls from spreading apart during an impact. This also eliminates the need for top and bottom fasteners.

Figure 11:
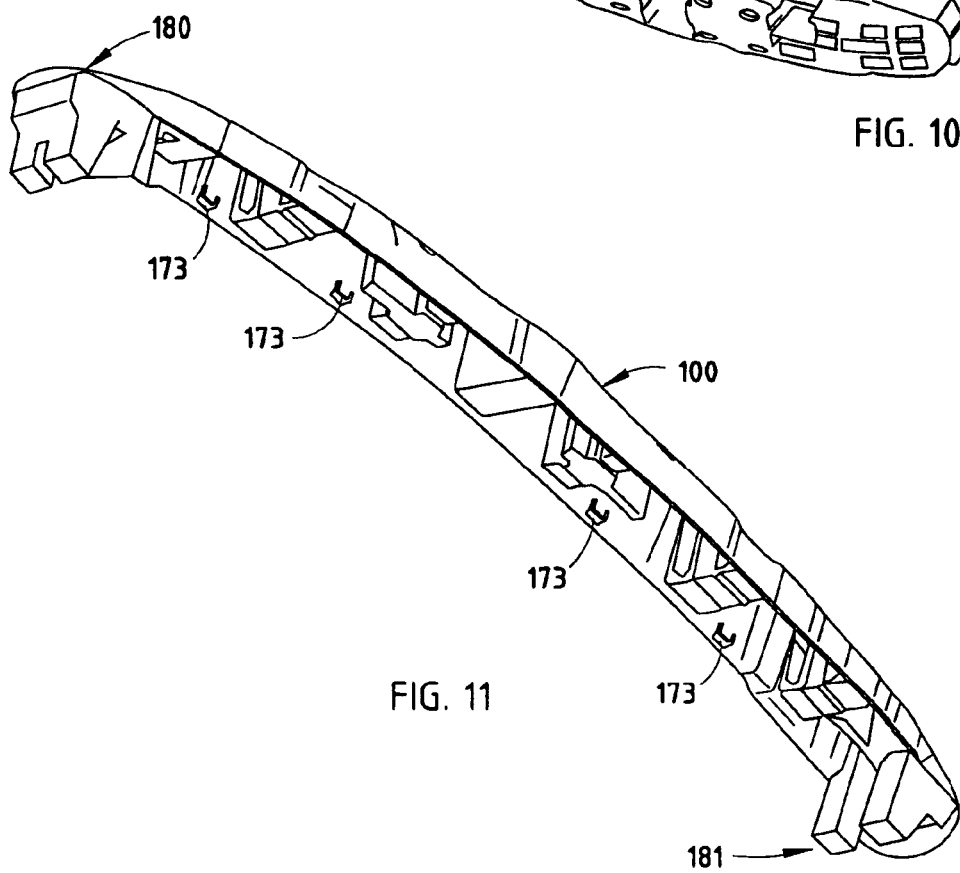
FIG. 11 is a rear perspective view of the energy absorber of FIG. 10.
Figure 14:
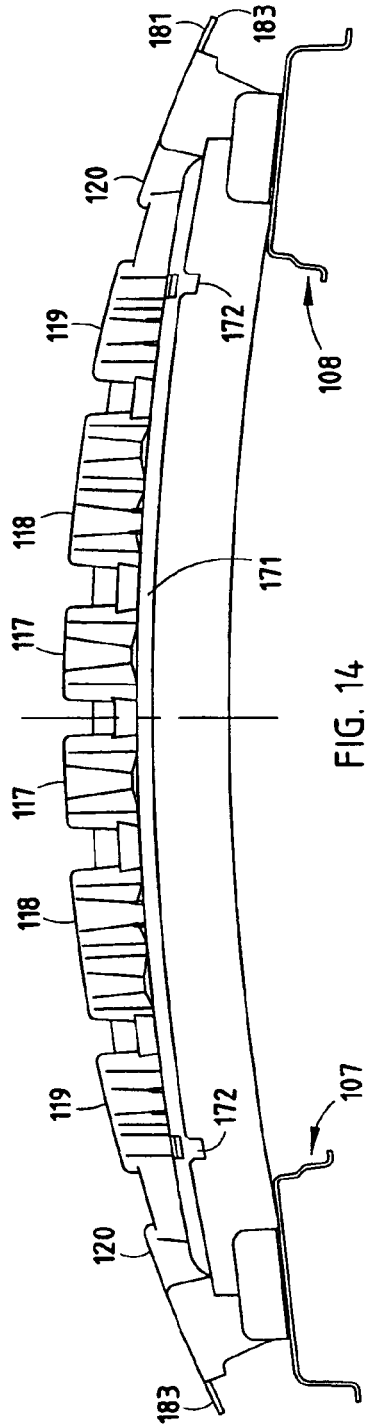

A top flange 170 (FIG. 13) and a bottom flange 171 (FIG. 14) are formed on top and bottom edges of the rear wall 164. The flanges 170 and 171 wrap onto tops and bottoms of the bumper beam 101. Fingertip-like pads 172 are formed on the flanges 170 and 171 for engaging mating areas on the top surface and on the bottom surface of the bumper beam 101 to temporarily frictionally retain the energy absorber 102 on the bumper beam 101. Also, hooks 173 (FIGS. 10–11) are formed on tabs that extend from (and co-planar with) the top and bottom walls 122, 123, 132, 133, 142, 143, 152, and 153. The hooks 173 are shaped to engage mating holes in a front face of the bumper beam 101. The hooks 173 (and also flanges 53–54) provide an opportunity for "blind" snap-attachment, such as when an operator has preassembled an energy absorber to a fascia, and then attaches the assembled absorber/fascia as a unit to a vehicle front. In such event, the fascia prevents the operator from attaching the absorber to a bumper beam.

Figure 22:
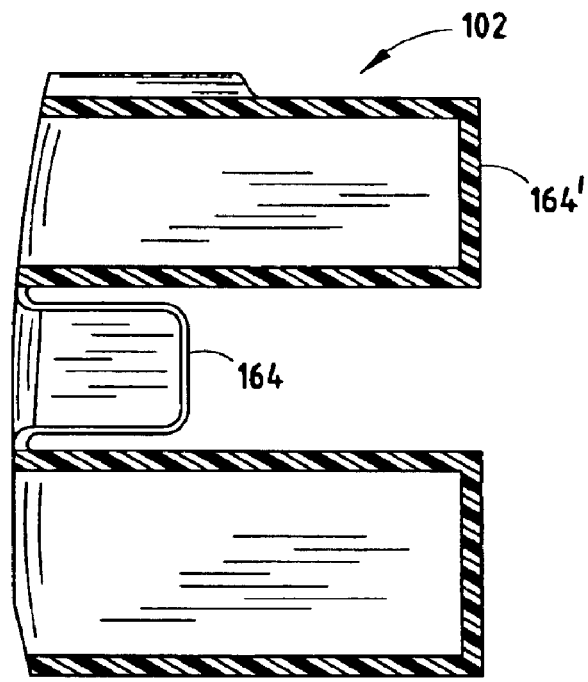
Figure 24:
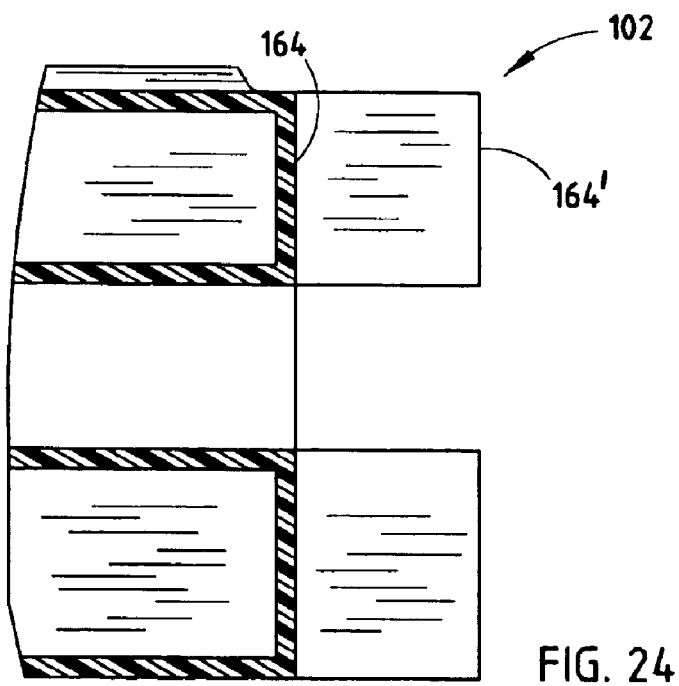

The energy absorber 102 (FIG. 11) includes integrally-formed end sections 180 and 181 that are symmetrically shaped and that are optimally shaped to form end-located crush boxes for energy absorption upon corner impact to a vehicle. The end sections 180 and 181 each include a vertical rib 182 (FIG. 12A) that transversely crosses and connects to the horizontal ribs 160–63 to form a honeycomb shape. The outboard sidewall 155 is extended rearwardly so that it substantially covers the open end of the tube sections on the bumper beam 101. Also, the rear wall 164 is extended at a location 164' (FIGS. 22, 24, and 25) from the outboard sidewall 155 to form a rearwardly extending box 164" (FIG. 25) that fits adjacent an end of the bumper beam. It is noted that the mounting brackets 107 and 108 can include a forward loop 111 that holds the box 164" in place against an end of the bumper beam, if desired. A crescent-shaped flange 183 extends coplanar with the face front walls 121, 131, 141, and 151. The flange 183 is stiff but flexible, such that it does a good job of supporting front-end fascia, such as RIM urethane fascia, placed on it. At the same time, the flange 183 is flexible for flexing during a corner impact on a vehicle, thus reducing damage to the vehicle.

Figure 21:
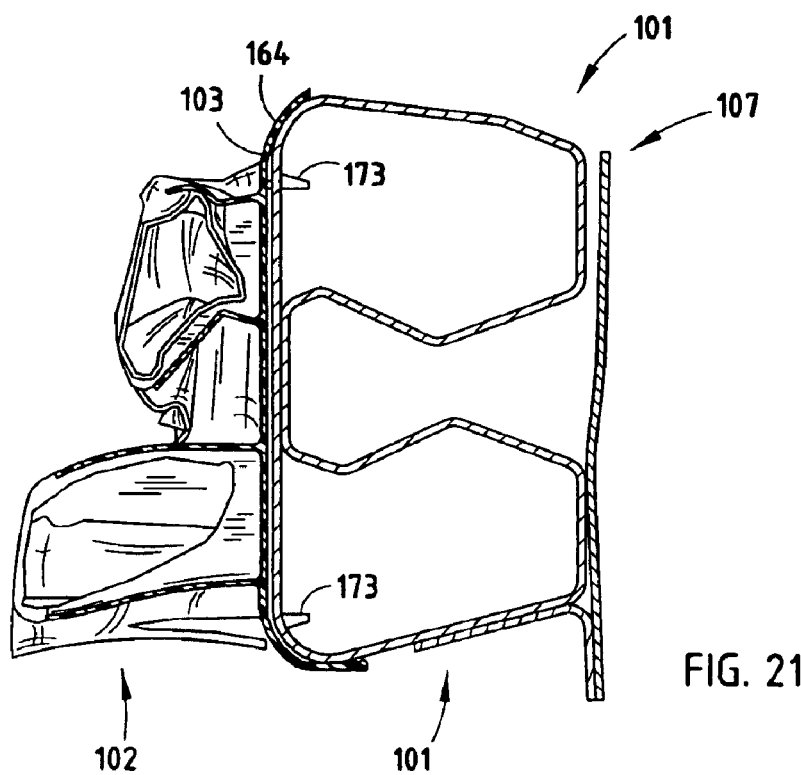
FIGS. 21 and 23 are views similar to FIGS. 20 and 22, but after being deformed after impact.
Figure 23:
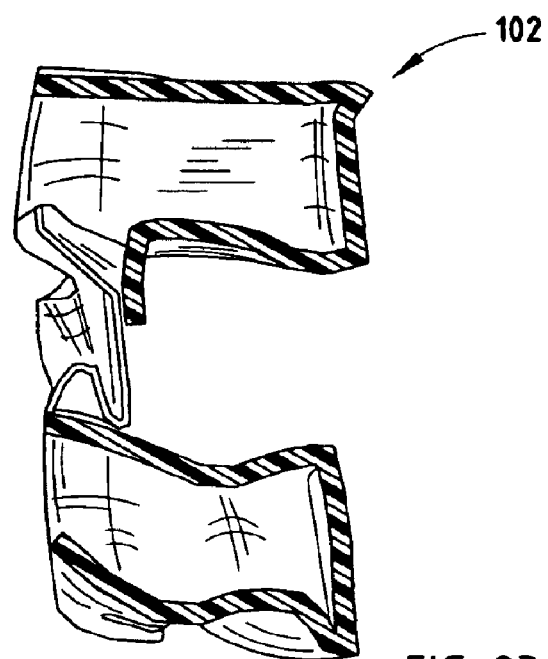

The illustrated top and bottom walls 122, 123, 132, 133, 142, 143, 152, and 153 are wave-shaped or corrugated in shape to facilitate molding and strength. The illustrated walls of the box-shaped sections 117–120 and walls 160–163 and adjacent areas are about 2 mm thick, while the walls of the end sections 180 and 181 are about 3 to 4 mm thick. (Compare FIGS. 16–20 to the FIGS. 22–25.) However, it is contemplated that the walls and thickness can be made any thickness, including localized variations made to optimize the energy absorption. Since the mold dies are relatively non-complex (since pulls and movable components for making blind surfaces are not required), the walls can be made thicker relatively easily by grinding away metal in the molding dies. Also, the apertures can be made smaller by grinding away metal, such that the crush/impact strength can be closely and accurately controlled, and also can be carefully adjusted and tuned to react to the actual results of vehicle crash testing during bumper development for a particular model vehicle. For example, by reviewing the energy absorber 102 and bumper beam 101 after an impact (compare FIGS. 20 and 22 which are before impact, and FIGS. 21 and 23 which are after impact), intelligent decisions can be made regarding what areas of the energy absorber 102 require additional strength, and what areas need to be weakened. For example, by changing a shape of the curved edge of the apertures 126, 136, 146 and 156, a different energy absorption curve results on a force vs deflection graph of a vehicle impact. Specifically, the rates of increase in energy absorption can be controlled and more accurately adjusted while "tweaking" and fine-tuning the energy absorber 102. Substitution of different material blends in the energy absorber 102 also can help.

In particular, it is noted that the end sections 180 and 181 of the present energy absorber 102 form integral box-shaped sections that provide a very consistent and strong corner impact strength. The honeycomb shape formed by ribs 160–163 and ribs 153 and 182 along with the crescent-shaped flange 183 and the interaction of the end sections 180–181 with the J-shaped section 110 of the mounting bracket 107 and 108 and the end of the tube sections 104 and 105 of the bumper beam 101 are important aspects of the present invention. Also, an important inventive aspect is the concept of fine-tuning the energy absorber 102 by changing wall thicknesses and providing apertures of different sizes to optimize a bumper system.

Yet another important feature of the present illustrated design of the energy absorber 102 is shown by the offset 163A in lower wall 163, which connects the front and rear portions 163B and 163C of wall 163. During impact, the front portion 163B telescopes overlappingly onto the rear portion 163C, with the offset 163A wrapping back upon itself and between the portions 163B and 163C. This "wrapping" action provides high-energy absorption and a very consistent and predictable collapse, which is very desirable in energy absorbers.

The present invention is described as utilizing a B-shaped double-tube bumper beam that is rollformed and swept. The present B-shaped bumper beam is sufficiently described herein for a person skilled in the art to understand and practice the present invention, but it is noted that the process and method of making the illustrated B-shaped bumper beam is described in greater detail in Sturrus patent U.S. Pat. No. 5,454,504, if the reader desires such information. It is specifically contemplated that the present invention could be used in combination with a bumper beam having a shallower channel instead of the deep channel illustrated. For example, the present invention would work on a D-shaped bumper where the bumper beam had a vertically-extending surface extending across a significant vertical portion of a front face of the bumper beam but does not extend completely across a vertical front face of the bumper beam. On the merits, the teachings of U.S. Pat. No. 5,454,504 are incorporated herein in its entirety for the purpose of providing a complete disclosure of the entire bumper system.

FURTHER EMBODIMENT

In regard to the illustrated preferred embodiment, a bumper system 320 (FIGS. 26–31) for vehicles includes a bumper beam 321 and an energy absorber 322 attached to a face of the bumper beam 321. The illustrated beam is rollformed and swept (see Sturrus patent U.S. Pat. No. 5,454,504) and has a continuous B-shaped double-tubular cross section (FIG. 27). The double tubes are spaced vertically apart and include top and bottom mid-walls 323 and 324 defining a longitudinally-extending channel 325 along its rear surface. A polymeric energy absorber 322 has a length with multiple box-shaped sections 327 (five box-shaped sections are shown, but not all are the same length) that abut the front surface 326 of the bumper beam 321. The energy absorber 322 further includes a plurality of tying sections 328 that extend longitudinally between the box-shaped sections 327 and also vertically between top and bottom portions 327' and 327" of the box-shaped sections 327, as discussed below.

The B-shaped section of the bumper beam 321 (FIG. 28) includes, in addition to top and bottom mid-walls 323 and 324, a top wall 334, a rear upper wall 335, a bottom wall 336, a rear lower wall 337, a primary front wall 338 and a channel-forming overlapping front wall 339. The top tube of the bumper beam 321 is formed by the walls 323, 334, 335, and 338. The bottom tube of the bumper beam 321 is formed by the walls 324, 336, 337, and 338. The top and bottom tubes are interconnected by front walls 338 and 339. Each of these walls 323–324 and 334–339 can be flat or non-flat. For example, in some bumper systems (such as the illustrated bumper beam), it has been found to be beneficial to make the horizontal walls 323, 324, 334, and 336 slightly bent or curved (in a front-to-rear direction), both for purposes of providing a bumper beam that is less likely to prematurely kink and more likely to reliably and consistently bend, but also for the purpose of ease of manufacture of the bumper beam. As illustrated, the mid-walls 323 and 324 include rear portions that are angled to create a tapered throat.

The energy absorber 322 is a molded component of non-foam polymer, such as a blend of PC/ABS/TPE. For example, it is contemplated that General Electric's XENOY polymer will work for this purpose. The energy absorber 322 includes five box-shaped sections 327 that abut a front of the front wall 338. Tying walls 328 hold the box-shaped sections 327 together. The illustrated box-shaped sections 327 include top and bottom U-shaped sections 327' and 327". The top sections 327' engaging the top of front wall 338 are shaped slightly different (i.e. taller) than the bottom sections 327" that engage the bottom of front wall 338, but it is contemplated that they can be made similar in size and shape, if desired. The box-shaped sections 327 (FIG. 8A) each include a top wall 341, a bottom wall 342, and opposing sidewalls 343 and 344. A flat front wall 345 extends around walls 341–344 and forms a perimeter around them, tying the walls 341–344 together. Additionally, the box-shaped sections 327 include a top wall 341A, a bottom wall 342A, and opposing end walls 343A and 344A that extend from the outer edges of front wall 345 and extend parallel the walls 341–344, respectively. The U-shaped top section 327' is formed by walls 341 and 342, which form parallel legs, and by wall 345, which forms a vertical leg. The U-shaped section 327" is formed by walls 341A and 342A, which are parallel, and by vertical leg 345A. A rear wall 346 extends outwardly from the walls 341A–344A forming a perimeter. The section 328 is that part of wall 346 that interconnects and ties adjacent box-like sections 327 together. All walls of sections 327 (and wall 328) are about 1.5 to 3.5 mm thick, or more preferably about 2.0 mm to 2.5 mm thick. It is noted that the top and bottom walls 341, 341A, 342, 342A, when viewed from a position in front of the bumper system, can be wavy and undulating or otherwise non-linear and non-flat in shape. The other walls can also be wavy or undulating. This provides the walls with increased strength for resisting buckling, and also helps eliminate distortions, such as snaking, that occur when molding a long part. It is also noted that the walls 341, 341A, 342, and 342A extend longitudinally on the bumper beam 321, but are discontinuous and further include non-blind surfaces to prevent die lock when molding. (i.e. This allows mold tooling to pass through the plane of one wall to form another wall.) In other words, the energy absorber 322 can be made by using male and female molds, neither of which require secondary or movable die components for forming the energy absorber 322.

The box-shaped sections 327 of the illustrated energy absorber 322 are able to absorb significant energy without failure, such as may be incurred in a low energy impact. Thus, in a low energy impact, the energy absorber 322 absorbs the impact energy, and the bumper beam 321 does not permanently or temporarily deform. In an intermediate energy impact, the bumper beam 321 and the energy absorber 322 do deflect and absorb energy, but do not permanently deform. However, the walls 323–324 and 334–339 of the energy absorber 322 may permanently deform. In a high-energy impact, both the energy absorber 322 and the bumper beam 321 initially absorb energy and then buckle as they approach a maximum amount of deflection. The point of buckling is designed into the bumper system 320 to cause a maximum amount of energy to be absorbed without damaging the vehicle, while considering all relevant factors such as occupant safety, government standards, and the like.

Figure 32:
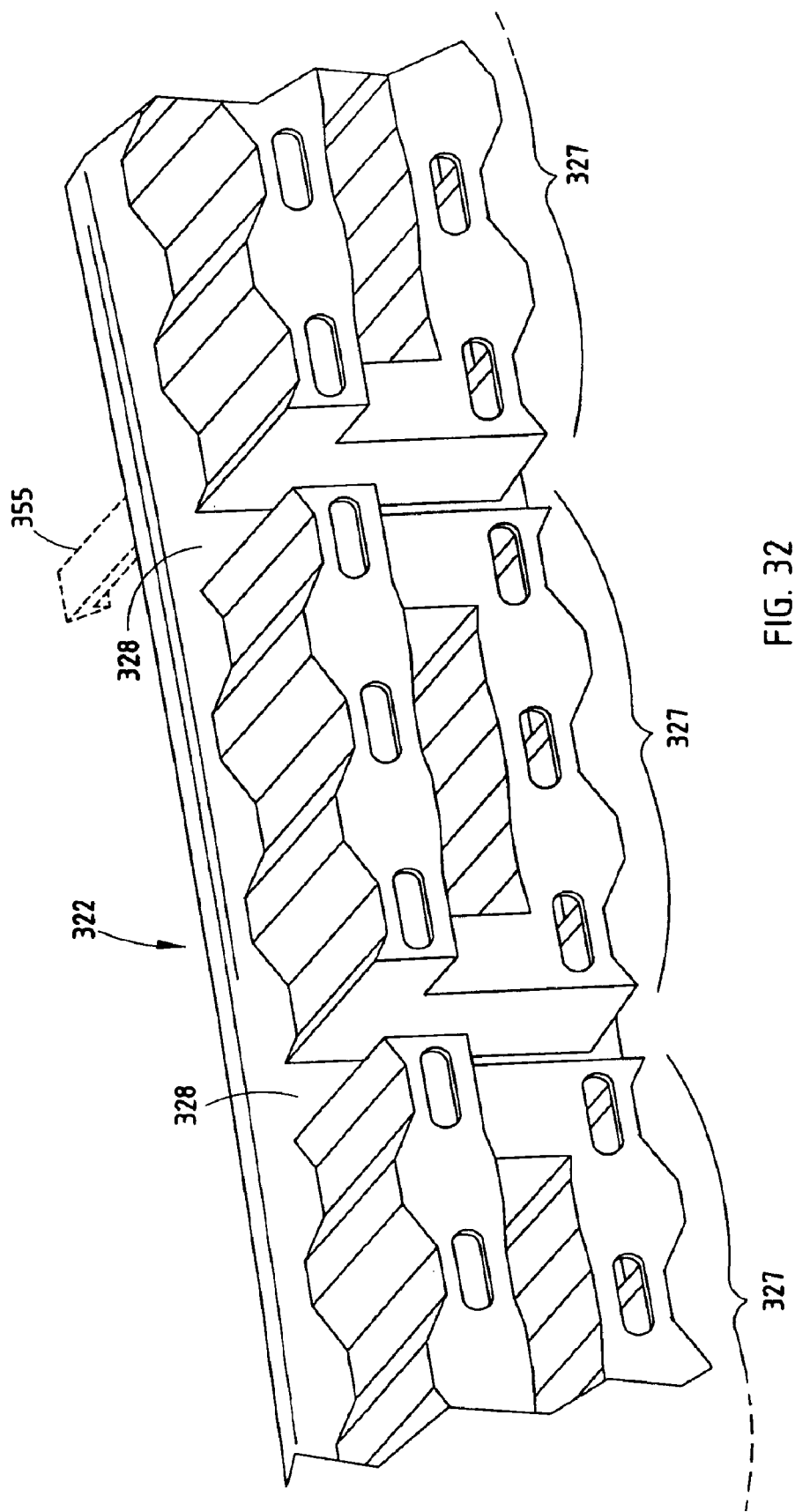

A top lip 353 extends rearwardly from the top of wall 346 of the box section 327, and a bottom lip 354 extends rearwardly from the bottom of wall 346 of the box section 327. The lips 353 and 354 engage top and bottom surfaces on the bumper beam 321. Optionally, the lips 353 and 354 can include attachment tabs or hooks (see hook tab 55 in FIG. 32 and hook tab 56 in FIG. 8) for engaging apertures or features in the bumper beam 321 for retaining (temporarily or permanently) to the bumper beam 321. These lips 353 and 354 are advantageous in that all (or most) fasteners can be eliminated for attaching the energy absorber 322 to the bumper beam 321. It is contemplated that the vehicle front fascia 357 (FIG. 30) can be used to hold the energy absorber 322 on the bumper beam 321 without any fasteners, if desired, as noted below.

It is noted that the present arrangement faces a "flat side" of the B-shaped cross section of the bumper beam 321 toward the energy absorber 322, although it is contemplated that the present inventive energy absorber 322 can be positioned against the lobed part of the B-shaped bumper beam 321 and function satisfactorily. In such case, the B-shaped bumper beam 321 would be swept with its "flat" face on the vehicle side of the bumper beam and facing rearwardly.

In the present bumper system, the energy absorber 322 is relatively loosely supported on the bumper beam 321. This is unusual in that historically, automobile manufacturers want the position of the energy absorbers closely controlled and well-fastened to the bumper beam. However, testing has shown that a relatively loose energy absorber can, if properly designed, actually assist in preventing premature collapse of the energy absorber by allowing the energy absorber to adjust to the impacting object to better "face" the impacting object as the impact collision occurs.

It is to be understood that variations and modifications can be made on the aforementioned structure without departing from the concepts of the present invention, and further it is to be understood that such concepts are intended to be covered by the following claims unless these claims by their language expressly state otherwise. Further, it is to be understood that methods related to the above concepts are believed to be within a scope of the present invention.

We claim:

1. A bumper system for a passenger vehicle comprising:
 a beam having front and rear beam walls, and that is adapted for attachment to a vehicle frame; the front beam wall including at least one aperture in the front beam wall, with the rear beam wall including a support area located behind and spaced from the at least one aperture; and
 an energy absorber supported against the front beam wall, the energy absorber including a plurality of horizontally-extending longitudinally-extending top and bottom walls and further including front and rear walls, the energy absorber walls including at least one structural column extending from the front wall through the rear wall and through the at least one aperture in the front beam wall to a location near the support area on the rear beam wall, wherein the front wall of the energy absorber receives support from the rear beam wall via the structural column.

2. The bumper system defined in claim 1, wherein the at least one aperture includes at least two apertures, and wherein the at least one column includes at least two columns.

3. The bumper system defined in claim 2, wherein the at least one column defines a tubular shape.

4. The bumper system defined in claim 1, wherein the at least one column is configured to temporarily support the energy absorber on the beam.

5. The bumper system defined in claim 1, wherein the at least one column defines a tubular shape.

6. A bumper system for a passenger vehicle, the vehicle defining a fore-to-aft direction, comprising:
 a beam adapted for attachment to a vehicle frame, the beam having elongated front and rear beam walls when the beam is positioned in a vehicle-mounted position; the front beam wall including at least one aperture, and the rear beam wall including a support area located behind and spaced rearwardly from the at least one aperture; and
 an energy absorber having a rear surface supported against the front beam wall, the energy absorber including at least one rearwardly-extending structural protrusion that extends from the rear surface through the at least one aperture to a location proximate the support area on the rear beam wall, wherein the energy absorber receives support from the rear beam wall via the structural protrusion during a vehicle crash.

7. The bumper system defined in claim 6, wherein the at least one aperture includes at least two apertures, and wherein the at least one structural protrusion includes at least two structural protrusions.

8. The bumper system defined in claim 7, wherein the at least one structural protrusion defines a tubular shape.

9. The bumper system defined in claim 8, wherein the tubular shape has a cross sectional size generally matching a shape of the at least one aperture.

10. The bumper system defined in claim 9, wherein the at least one structural protrusion includes a second tubular shape spaced from the first-mentioned tubular shape, and the at least one aperture includes a second aperture that aligns with the second tubular shape.

11. The bumper system defined in claim 10, wherein the tubular shapes abut the rear beam wall.

12. The bumper system defined in claim 6, wherein the beam includes a pair of mounts adapted to mount the beam to a vehicle frame, the at least one protrusion includes a pair of tubular shapes each being aligned with one of the pair of mounts.

13. The bumper system defined in claim 6, wherein the at least one structural protrusion is configured to temporarily support the energy absorber on the beam during assembly.

14. The bumper system defined in claim 6, wherein the at least one structural protrusion defines a tubular shape.

15. The bumper system defined in claim 6, wherein the beam includes a pair of mounts adapted to generally with frame rails on a vehicle, and the at least one structural protrusion includes a pair of protrusions that generally align with the pair of mounts.

16. The bumper system defined in claim 6, wherein the energy absorber is a molded polymeric component and the beam is a metal component made from sheet material.

17. The bumper system defined in claim 16, wherein the beam defines a continuous cross sectional shape and is rollformed.

18. The bumper system defined in claim 6, wherein the at least one structural protrusion includes an end that abuts the rear beam wall.

19. The bumper system defined in claim 6, wherein the at least one structural protrusion extends from a front wall of the energy absorber.

20. The bumper system defined in claim 6, wherein the energy absorber includes front and rear walls that are spaced apart, and the at least one structural protrusion is a tubular column extending from the front wall past the rear wall of the energy absorber and through the at least one aperture into abutting contact with the rear beam wall.

* * * * *